US012754396B2

(12) United States Patent
Suzuki

(10) Patent No.: US 12,754,396 B2
(45) Date of Patent: Oct. 6, 2026

(54) IMAGING OPTICAL SYSTEM, IMAGE CAPTURE DEVICE, AND CAMERA SYSTEM

(71) Applicant: Panasonic Intellectual Property Management Co., Ltd., Osaka (JP)

(72) Inventor: Emiri Suzuki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 233 days.

(21) Appl. No.: 18/615,065

(22) Filed: Mar. 25, 2024

(65) Prior Publication Data

US 2024/0329362 A1 Oct. 3, 2024

(30) Foreign Application Priority Data

Mar. 30, 2023 (JP) ................................ 2023-054468

(51) Int. Cl.

| | |
|---|---|
| ***G02B 9/64*** | (2006.01) |
| ***G02B 7/14*** | (2021.01) |
| ***G03B 17/14*** | (2021.01) |
| ***H04N 23/55*** | (2023.01) |
| ***H04N 23/80*** | (2023.01) |

(52) U.S. Cl.

CPC ................ *G02B 9/64* (2013.01); *G02B 7/14* (2013.01); *G03B 17/14* (2013.01); *H04N 23/55* (2023.01); *H04N 23/80* (2023.01)

(58) Field of Classification Search

CPC . G02B 9/64; G02B 7/14; H04N 23/80; H04N 23/55; G03B 17/14

USPC ........................................................ 359/754

See application file for complete search history.

(56) References Cited

U.S. PATENT DOCUMENTS

| | | | | | |
|---|---|---|---|---|---|
| 4,462,664 | A * | 7/1984 | Moskovich | G02B 15/22 | 359/687 |
| 4,545,655 | A * | 10/1985 | Fantone | G02B 13/22 | 359/708 |
| 2001/0012450 | A1 * | 8/2001 | Wakui | G03B 17/24 | 396/298 |

FOREIGN PATENT DOCUMENTS

| | | |
|---|---|---|
| JP | 2022-73433 | 5/2022 |

* cited by examiner

*Primary Examiner* — Bumsuk Won
*Assistant Examiner* — Mitchell T Oestreich
(74) *Attorney, Agent, or Firm* — Wenderoth, Lind & Ponack, L.L.P.

(57) ABSTRACT

An imaging optical system consists of: a first lens group having positive power; a second lens group having negative power; and a third lens group having positive power. The second lens group moves along an optical axis of the optical system toward an image plane, while the optical system is focusing to switch from an infinity in-focus state to a close-object in-focus state. The first lens group includes a negative lens having a convex surface facing the object and located closest to the object. The second lens group is located closer to the image plane than an aperture stop and consists of: a positive lens having a convex surface facing the object; and a negative lens. The third lens group consists of three or more lenses including one or more negative lenses. One of the three or more lenses which is located closest to the object is a positive lens.

10 Claims, 16 Drawing Sheets

IMAGING OPTICAL SYSTEM, IMAGE CAPTURE DEVICE, AND CAMERA SYSTEM

CROSS-REFERENCE TO RELATED APPLICATIONS

The present application is based on, and claims the benefit of foreign priority to, Japanese Patent Application No. 2023-054468, filed on Mar. 30, 2023, the entire contents of which are hereby incorporated by reference.

TECHNICAL FIELD

The present disclosure generally relates to an imaging optical system, an image capture device, and a camera system. More particularly, the present disclosure relates to an imaging optical system with the ability to compensate for various types of aberrations sufficiently, and also relates to an image capture device and camera system including such an imaging optical system.

BACKGROUND ART

JP 2022-073433 A discloses an imaging optical system including: a first lens group G1 having positive refractive power; an aperture stop S; a second lens group G2 having negative refractive power; and a third lens group G3 having positive refractive power, where the first lens group G1, the aperture stop S, the second lens group G2, and the third lens group G3 are arranged in this order such that the first lens group G1 is located closer to the object than the aperture stop S or the second or third lens group G2, G3 is. In the imaging optical system, while focusing is made toward the close object, the second lens group G2 moves toward the image plane, and the first lens group G1, the aperture stop S, and the third lens group G3 are fixed with respect to the image plane. The second lens group G2 consists of a negative lens Ln and a positive lens Lp, which are arranged in this order such that the negative lens Ln is located closer to the object than the positive lens Lp is.

SUMMARY

The present disclosure provides an imaging optical system with the ability to compensate for various types of aberrations sufficiently, and an image capture device and camera system including such an imaging optical system.

An imaging optical system according to an aspect of the present disclosure consists of: a first lens group having positive power; a second lens group having negative power; and a third lens group having positive power. The first lens group, the second lens group, and the third lens group are arranged in this order such that the first lens group is located closer to an object than the second lens group or the third lens group is. The second lens group moves along an optical axis of the imaging optical system toward an image plane, while the imaging optical system is focusing to make a transition from an infinity in-focus state toward a close-object in-focus state. The first lens group includes a negative lens having a convex surface facing the object. The negative lens is located closest to the object in the first lens group. The second lens group is located closer to the image plane than an aperture stop is. The second lens group consists of: a positive lens Lp having a convex surface facing the object; and a negative lens Ln. The positive lens Lp and the negative lens Ln are arranged in this order such that the positive lens Lp is located closer to the object than the negative lens Ln is.

The third lens group consists of three or more lenses. The three or more lenses include one or more negative lenses. One of the three or more lenses which is located closest to the object in the third lens group is a positive lens.

A camera system according to another aspect of the present disclosure includes: an interchangeable lens unit including the imaging optical system described above; and a camera body including an image sensor that receives an optical image formed by the imaging optical system and transforms the optical image into an electrical image signal and a camera mount. The camera body is to be connected removably to the interchangeable lens unit via the camera mount. The interchangeable lens unit forms the optical image of the object on the image sensor.

An image capture device according to still another aspect of the present disclosure transforms an optical image of the object into an electrical image signal and displays and/or stores the electrical image signal thus transformed. The image capture device includes the imaging optical system described above and an image sensor. The imaging optical system forms the optical image of the object. The image sensor transforms the optical image formed by the imaging optical system into the electrical image signal.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

Figure 1A:
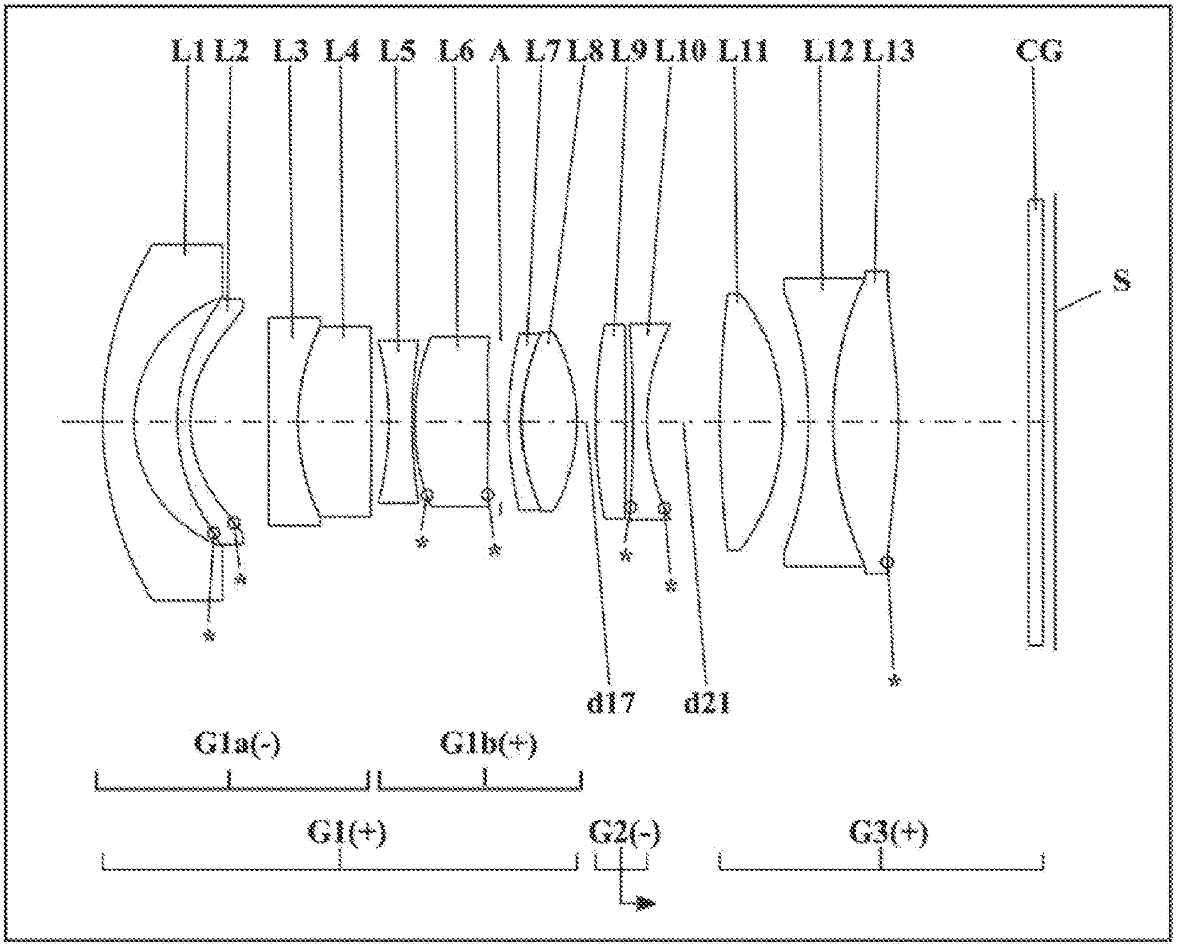
FIG. 1A illustrates lens arrangements showing an infinity in-focus state of an imaging optical system according to a first embodiment (corresponding to a first example of numerical values)
Figure 1B:
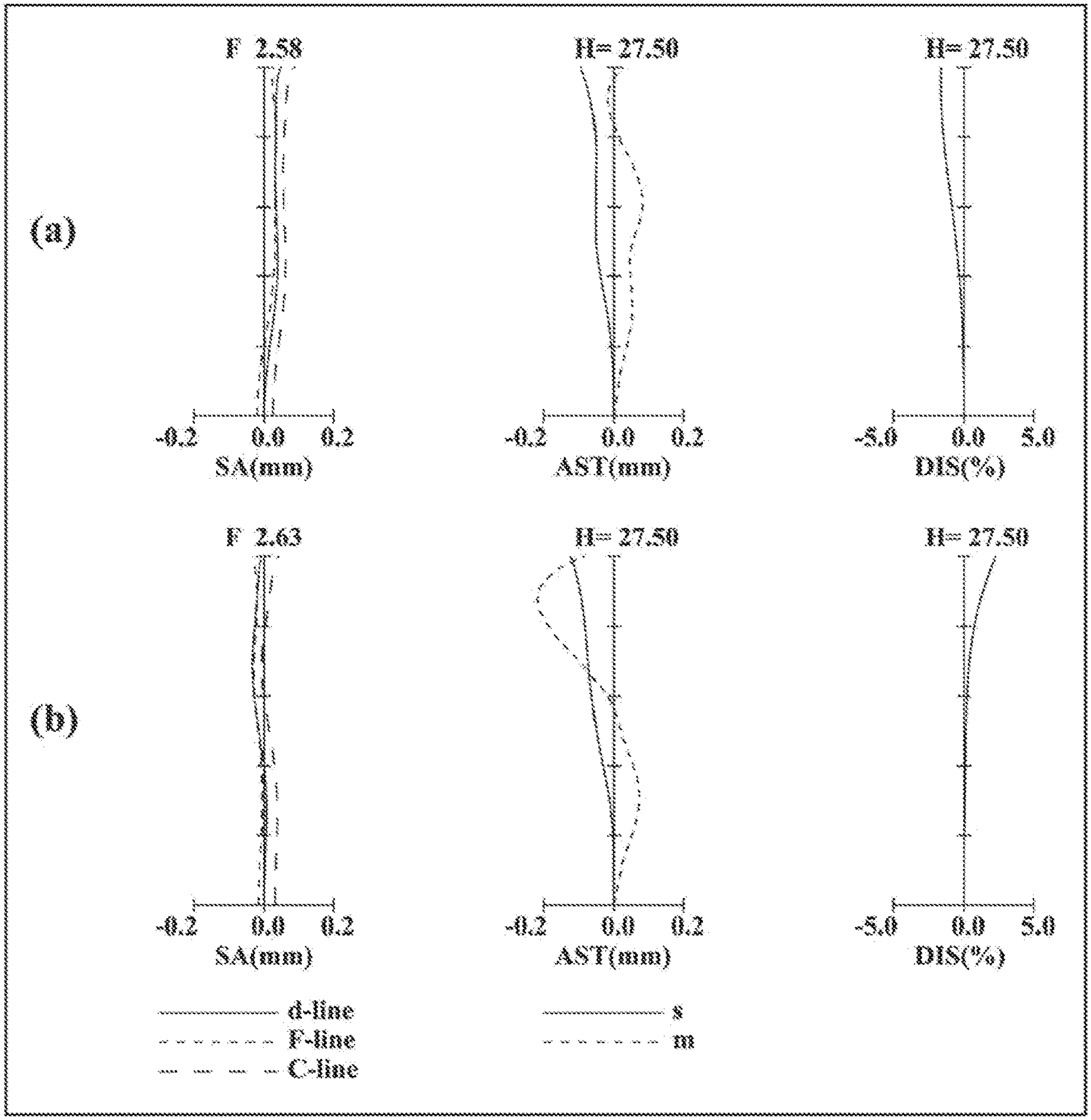
FIG. 1B illustrates longitudinal aberration diagrams showing what state the imaging optical system assumes in the first example of numerical values.

Embodiments of the present disclosure will now be described in detail with reference to the accompanying drawings as appropriate. Note that unnecessarily detailed description will be omitted. For example, detailed description of already well-known matters and redundant description of substantially the same configuration will be omitted. This is done to avoid making the following description overly redundant and thereby help one of ordinary skill in the art understand the present disclosure easily.

In addition, note that the accompanying drawings and the following description are provided by the applicant to help one of ordinary skill in the art understand the present disclosure fully and should not be construed as limiting the scope of the present disclosure, which is defined by the appended claims.

First to Seventh Embodiments

FIGS. 1A, 2A, 3A, 4A, 5A, 6A, and 7A illustrate lens arrangements and operations of an imaging optical system according to first to seventh embodiments, respectively.

As used herein, the terms "in-focus," "focusing," and "focus" refer to the imaging optical system which is "in focus" state, "focusing," and in "focus" unless otherwise stated. In addition, the "optical axis" as used herein refers to the optical axis of the imaging optical system unless otherwise stated.

The upper portion of FIGS. 1A, 2A, 3A, 4A, 5A, 6A, and 7A illustrates lens arrangements in the infinity in-focus state. In the upper portion of FIGS. 1A, 2A, 3A, 4A, 5A, 6A, and 7A, the straight line drawn at the right end indicates the position of the image plane S (corresponding to a plane on which the image sensor is disposed, and which faces the object as will be described later). Thus, in each of these drawings, the left side corresponds to the object side. In addition, a low-pass filter or cover glass CG, for example, may be arranged between the lens group on the last stage, facing the image plane S, of the imaging optical system and the image plane S. Note that respective upper portions of FIGS. 1A, 2A, 3A, 4A, 5A, 6A, and 7A have the same aspect ratio.

In the upper portion of FIGS. 1A, 2A, 3A, 4A, 5A, 6A, and 7A, the asterisk (*) attached to a surface of a particular lens indicates that the surface is an aspheric surface. Note that in the lenses, an object-side surface or an image-side surface having no asterisks is a spherical surface.

On the second row of the lower portion of FIGS. 1A, 2A, 3A, 4A, 5A, 6A, and 7A, the respective lens groups are designated by the reference signs G1-G3 corresponding to their respective positions shown in the upper portion. Furthermore, the signs (+) and (−) added to the reference signs of the respective lens groups G1-G3 in the lower portion of FIGS. 1A, 2A, 3A, 4A, 5A, 6A, and 7A indicate the powers of the respective lens groups G1-G3. That is to say, the positive sign (+) indicates positive power, and the negative sign (−) indicates negative power.

Also, on the first row of the lower portion of FIGS. 1A, 2A, 3A, 4A, 5A, 6A, and 7A shown are sub-lens groups of the first lens group G1 shown on the second row of the lower portion. The reference sign "G1*a*" or "G1*b*" is added to each sub-lens group. The signs (+) and (−) added to the reference signs of the respective sub-lens groups (G1*a*, G1*b*) in the lower portion of FIGS. 1A, 2A, 3A, 4A, 5A, 6A, and 7A indicate the powers of the respective sub-lens groups (G1*a*, G1*b*). That is to say, the positive sign (+) indicates positive power, and the negative sign (−) indicates negative power.

Also, on the second row of the lower portion of FIGS. 1A, 2A, 3A, 4A, 5A, 6A, and 7A, an arrow indicating the direction of movement while the imaging optical system is focusing to make a transition from the infinity in-focus state toward the close-object in-focus state is drawn under the reference sign of a particular lens group (i.e., the second lens group G2).

First Embodiment

An imaging optical system according to a first embodiment will be described with reference to FIG. 1A.

FIG. 1A illustrates lens arrangements showing an infinity in-focus state of an imaging optical system according to the first embodiment and also illustrates how the imaging optical system operates in the infinity in-focus state.

As shown in FIG. 1A, the imaging optical system according to this embodiment includes a first lens group G1 having positive power, a second lens group G2 having negative power, and a third lens group G3 having positive power. The first, second, and third lens groups G1-G3 are arranged in this order such that the first lens group G1 is located closer to the object than the second lens group G2 or the third lens group G3 is and that the third lens group G3 is located closer to the image plane than the first lens group G1 or the second lens group G2 is.

The first lens group G1 is made up of: a sub-lens group G1*a* having negative power; and a sub-lens group G1*b* having positive power. The sub-lens groups G1*a*, G1*b* are arranged in this order such that the sub-lens group G1*a* is located closer to the object than the sub-lens group G1*b* is and that the sub-lens group G1*b* is located closer to the image plane than the sub-lens group G1*a* is.

The sub-lens group G1*a* is made up of a first lens L1 having negative power, a second lens L2 having negative power, a third lens L3 having negative power, and a fourth lens L4 having positive power. The first to fourth lenses L1-L4 are arranged in this order such that the first lens L1 is located closest to the object in the sub-lens group G1*a* and that the fourth lens L4 is located closest to the image plane in the sub-lens group G1*a*.

The third and fourth lenses L3, L4 are bonded together with an adhesive such as a UV curable resin to form a bonded lens. In other words, the bonded lens includes the third lens L3 and the fourth lens L4.

The sub-lens group G1*b* is made up of a fifth lens L5 having negative power, a sixth lens L6 having positive power, an aperture stop A, a seventh lens L7 having negative power, and an eighth lens L8 having positive power. The fifth and sixth lenses L5, L6, the aperture stop A, and the seventh and eighth lenses L7, L8 are arranged in this order such that the fifth lens L5 is located closest to the object in the sub-lens group G1*b* and that the eighth lens L8 is located closest to the image plane in the sub-lens group G1*b*.

The seventh and eighth lenses L7, L8 are bonded together with an adhesive such as a UV curable resin to form a bonded lens. In other words, the bonded lens includes the seventh lens L7 and the eighth lens L8.

The second lens group G2 is made up of a ninth lens L9 having positive power and a tenth lens L10 having negative power. The ninth and tenth lenses L9, L10 are arranged in this order such that the ninth lens L9 is located closer to the object than the tenth lens L10 is and that the tenth lens L10 is located closer to the image plane than the ninth lens L9 is.

The third lens group G3 is made up of an eleventh lens L11 having positive power, a twelfth lens L12 having negative power, and a thirteenth lens L13 having positive power. The eleventh to thirteenth lenses L11-L13 are arranged in this order such that the eleventh lens L11 is located closest to the object in the third lens group G3 and that the thirteenth lens L13 is located closest to the image plane in the third lens group G3.

The twelfth lens L12 and the thirteenth lens L13 are bonded together with an adhesive such as a UV curable resin to form a bonded lens. In other words, the bonded lens includes the twelfth lens L12 and the thirteenth lens L13.

Next, the respective lenses that form these lens groups of the imaging optical system according to this embodiment will be described.

First, the respective lenses belonging to the sub-lens group G1*a* will be described.

The first lens L1 is a meniscus lens having a convex surface facing the object. The second lens L2 is a meniscus lens having a convex surface facing the object. Both surfaces of the second lens L2 are aspheric surfaces. The third lens L3 is a meniscus lens having a convex surface facing the object. The fourth lens L4 is a biconvex lens.

Next, the respective lenses belonging to the sub-lens group G1*b* will be described.

The fifth lens L5 is a biconcave lens. The sixth lens L6 is a biconvex lens, both surfaces of which are aspheric surfaces. The seventh lens L7 is a meniscus lens having a convex surface facing the object. The eighth lens L8 is a biconvex lens.

Next, the respective lenses that form the second lens group G2 will be described.

The ninth lens L9 is a biconvex lens. The tenth lens L10 is a biconcave lens, both surfaces of which are aspheric surfaces.

The ninth lens L9 is an example of the positive lens Lp. The tenth lens L10 is an example of the negative lens Ln.

Next, the respective lenses that form the third lens group G3 will be described.

The eleventh lens L11 is a biconvex lens. The twelfth lens L12 is a biconcave lens. The thirteenth lens L13 is a biconvex lens. An image-side surface of the thirteenth lens L13 is an aspheric surface.

While the imaging optical system according to this embodiment is focusing to make a transition from an infinity in-focus state toward a close-object in-focus state, the first lens group G1 does not move, the second lens group G2 moves along the optical axis toward the image plane, and the third lens group G3 does not move. That is to say, while the imaging optical system is focusing to make a transition from the infinity in-focus state toward the close-object in-focus state, the first lens group G1 and the third lens group G3 are fixed with respect to the image plane S and the second lens group G2 moves along the optical axis toward the image plane.

More specifically, while the imaging optical system is focusing to make a transition from the infinity in-focus state toward the close-object in-focus state, the ninth lens L9 and the tenth lens L10 move toward the image plane.

Second Embodiment

An imaging optical system according to a second embodiment will be described with reference to FIG. 2A.

Figure 2A:
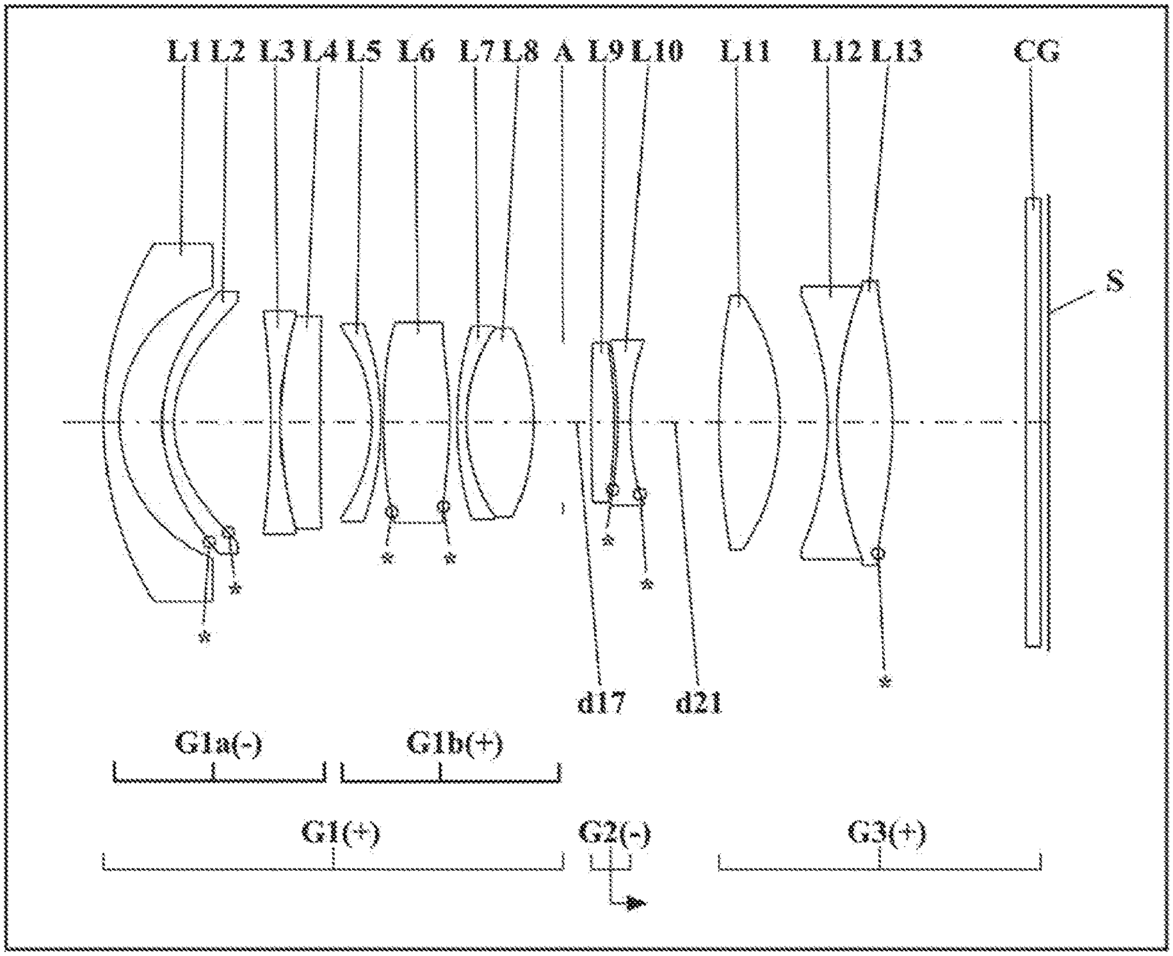
FIG. 2A illustrates lens arrangements showing an infinity in-focus state of an imaging optical system according to a second embodiment (corresponding to a second example of numerical values)
Figure 2B:
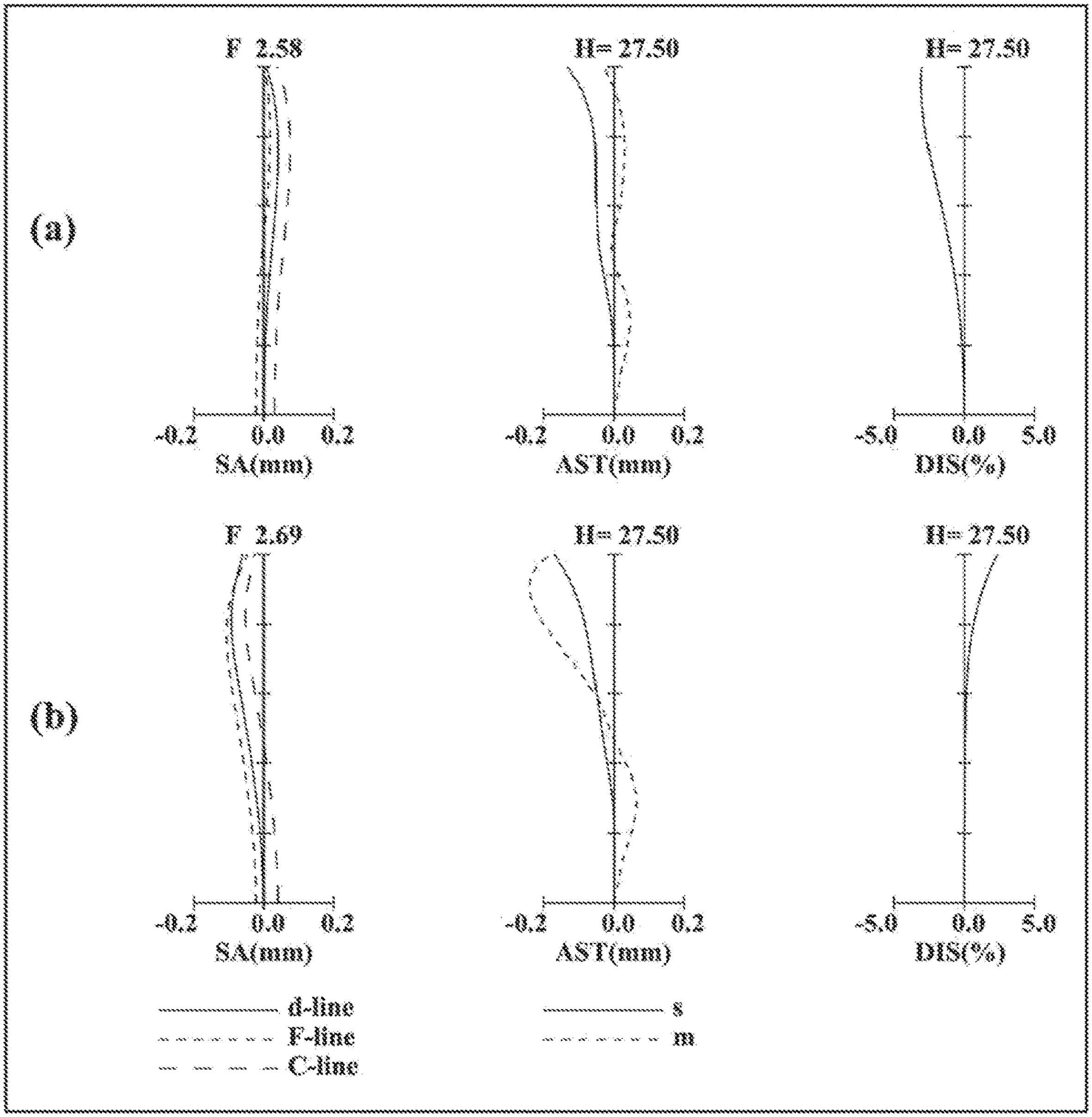
FIG. 2B illustrates longitudinal aberration diagrams showing what state the imaging optical system assumes in the second example of numerical values.

FIG. 2A illustrates lens arrangements showing an infinity in-focus state of an imaging optical system according to the second embodiment and also illustrates how the imaging optical system operates in the infinity in-focus state.

As shown in FIG. 2A, the imaging optical system according to this embodiment includes a first lens group G1 having positive power, a second lens group G2 having negative power, and a third lens group G3 having positive power. The first, second, and third lens groups G1-G3 are arranged in this order such that the first lens group G1 is located closer to the object than the second lens group G2 or the third lens group G3 is and that the third lens group G3 is located closer to the image plane than the first lens group G1 or the second lens group G2 is.

The first lens group G1 is made up of: a sub-lens group G1*a* having negative power; and a sub-lens group G1*b* having positive power. The sub-lens groups G1*a*, G1*b* are arranged in this order such that the sub-lens group G1*a* is located closer to the object than the sub-lens group G1*b* is and that the sub-lens group G1*b* is located closer to the image plane than the sub-lens group G1*a* is.

The sub-lens group G1*a* is made up of a first lens L1 having negative power, a second lens L2 having negative power, a third lens L3 having negative power, and a fourth lens L4 having positive power. The first to fourth lenses L1-L4 are arranged in this order such that the first lens L1 is located closest to the object in the sub-lens group G1*a* and that the fourth lens L4 is located closest to the image plane in the sub-lens group G1*a*.

The third and fourth lenses L3, L4 are bonded together with an adhesive such as a UV curable resin to form a bonded lens. In other words, the bonded lens includes the third lens L3 and the fourth lens L4.

The sub-lens group G1*b* is made up of a fifth lens L5 having negative power, a sixth lens L6 having positive power, a seventh lens L7 having negative power, and an eighth lens L8 having positive power. The fifth through eighth lenses L5-L8 are arranged in this order such that the fifth lens L5 is located closest to the object in the sub-lens group G1*b* and that the eighth lens L8 is located closest to the image plane in the sub-lens group G1*b*.

The seventh and eighth lenses L7, L8 are bonded together with an adhesive such as a UV curable resin to form a bonded lens. In other words, the bonded lens includes the seventh lens L7 and the eighth lens L8.

The second lens group G2 is made up of a ninth lens L9 having positive power and a tenth lens L10 having negative power. The ninth and tenth lenses L9, L10 are arranged in this order such that the ninth lens L9 is located closer to the object than the tenth lens L10 is and that the tenth lens L10 is located closer to the image plane than the ninth lens L9 is.

The third lens group G3 is made up of an eleventh lens L11 having positive power, a twelfth lens L12 having negative power, and a thirteenth lens L13 having positive power. The eleventh to thirteenth lenses L11-L13 are arranged in this order such that the eleventh lens L11 is located closest to the object in the third lens group G3 and that the thirteenth lens L13 is located closest to the image plane in the third lens group G3.

The twelfth lens L12 and the thirteenth lens L13 are bonded together with an adhesive such as a UV curable resin to form a bonded lens. In other words, the bonded lens includes the twelfth lens L12 and the thirteenth lens L13.

Next, the respective lenses that form these lens groups of the imaging optical system according to this embodiment will be described.

First, the respective lenses belonging to the sub-lens group G1*a* will be described.

The first lens L1 is a meniscus lens having a convex surface facing the object. The second lens L2 is a meniscus lens having a convex surface facing the object. Both surfaces of the second lens L2 are aspheric surfaces. The third lens L3 is a biconcave lens. The fourth lens L4 is a meniscus lens having a convex surface facing the object.

Next, the respective lenses belonging to the sub-lens group G1*b* will be described.

The fifth lens L5 is a meniscus lens having a convex surface facing the image plane. The sixth lens L6 is a biconvex lens, both surfaces of which are aspheric surfaces. The seventh lens L7 is a meniscus lens having a convex surface facing the object. The eighth lens L8 is a biconvex lens.

An aperture stop A is interposed between the first lens group G1 and the second lens group G2. Stated otherwise, the aperture stop A is interposed between the sub-lens group G1*b* and the second lens group G2.

Next, the respective lenses that form the second lens group G2 will be described.

The ninth lens L9 is a biconvex lens. The tenth lens L10 is a biconcave lens, both surfaces of which are aspheric surfaces.

The ninth lens L9 is an example of the positive lens Lp. The tenth lens L10 is an example of the negative lens Ln.

Next, the respective lenses that form the third lens group G3 will be described.

The eleventh lens L11 is a biconvex lens. The twelfth lens L12 is a biconcave lens. The thirteenth lens L13 is a biconvex lens. An image-side surface of the thirteenth lens L13 is an aspheric surface.

While the imaging optical system according to this embodiment is focusing to make a transition from an infinity in-focus state toward a close-object in-focus state, the first lens group G1 does not move, the second lens group G2 moves along the optical axis toward the image plane, and the third lens group G3 does not move. That is to say, while the imaging optical system is focusing to make a transition from the infinity in-focus state toward the close-object in-focus state, the first lens group G1 and the third lens group G3 are fixed with respect to the image plane S and the second lens group G2 moves along the optical axis toward the image plane.

More specifically, while the imaging optical system is focusing to make a transition from the infinity in-focus state toward the close-object in-focus state, the ninth lens L9 and the tenth lens L10 move toward the image plane.

Third Embodiment

An imaging optical system according to a third embodiment will be described with reference to FIG. 3A.

Figure 3A:
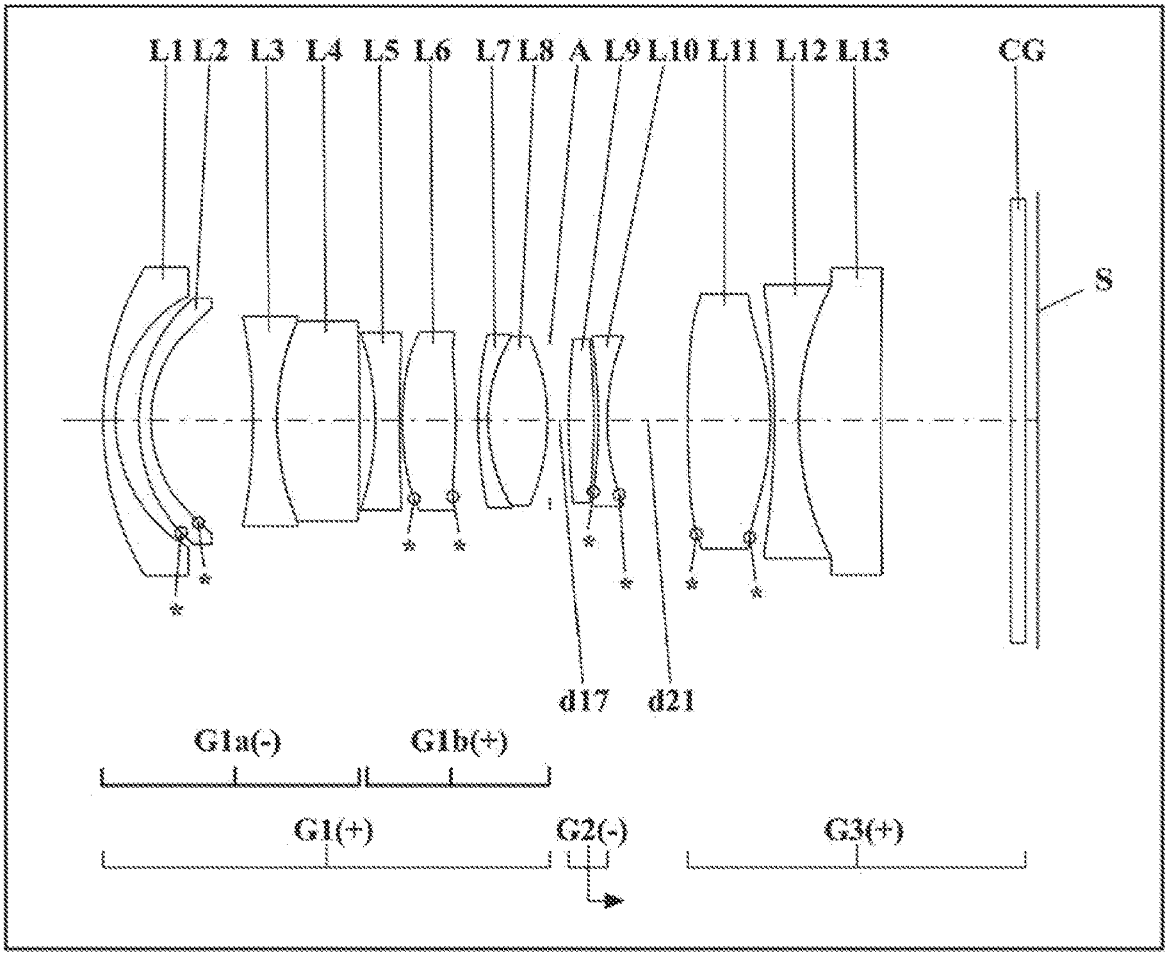
FIG. 3A illustrates lens arrangements showing an infinity in-focus state of an imaging optical system according to a third embodiment (corresponding to a third example of numerical values)
Figure 3B:
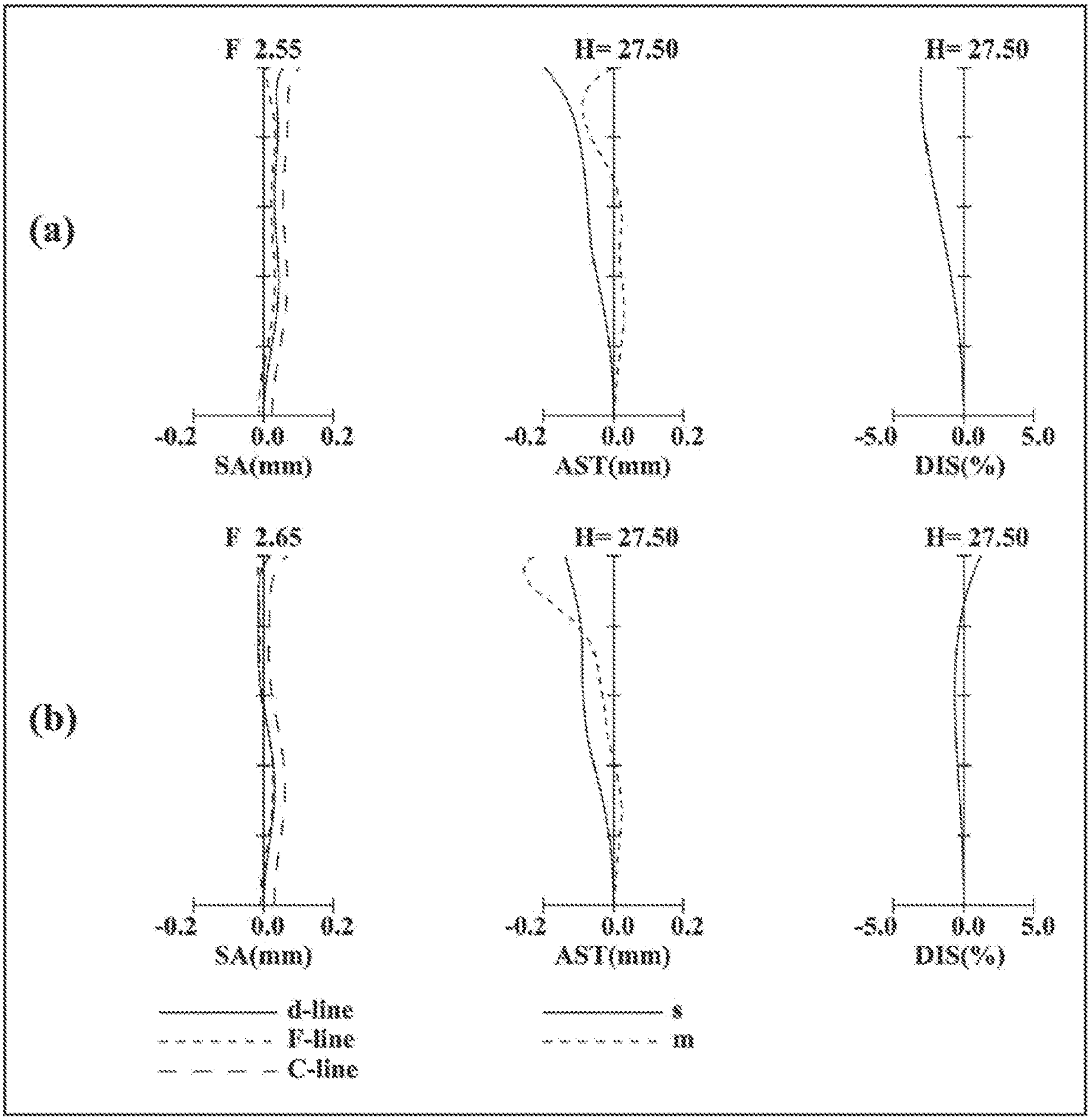
FIG. 3B illustrates longitudinal aberration diagrams showing what state the imaging optical system assumes in the third example of numerical values.

FIG. 3A illustrates lens arrangements showing an infinity in-focus state of an imaging optical system according to the third embodiment and also illustrates how the imaging optical system operates in the infinity in-focus state.

As shown in FIG. 3A, the imaging optical system according to this embodiment includes a first lens group G1 having positive power, a second lens group G2 having negative power, and a third lens group G3 having positive power. The first, second, and third lens groups G1-G3 are arranged in this order such that the first lens group G1 is located closer to the object than the second lens group G2 or the third lens group G3 is and that the third lens group G3 is located closer to the image plane than the first lens group G1 or the second lens group G2 is.

The first lens group G1 is made up of: a sub-lens group G1*a* having negative power; and a sub-lens group G1*b* having positive power. The sub-lens groups G1*a*, G1*b* are arranged in this order such that the sub-lens group G1*a* is located closer to the object than the sub-lens group G1*b* is and that the sub-lens group G1*b* is located closer to the image plane than the sub-lens group G1*a* is.

The sub-lens group G1*a* is made up of a first lens L1 having negative power, a second lens L2 having negative power, a third lens L3 having negative power, and a fourth lens L4 having positive power. The first to fourth lenses L1-L4 are arranged in this order such that the first lens L1 is located closest to the object in the sub-lens group G1*a* and that the fourth lens L4 is located closest to the image plane in the sub-lens group G1*a*.

The third and fourth lenses L3, L4 are bonded together with an adhesive such as a UV curable resin to form a bonded lens. In other words, the bonded lens includes the third lens L3 and the fourth lens L4.

The sub-lens group G1*b* is made up of a fifth lens L5 having negative power, a sixth lens L6 having positive power, a seventh lens L7 having negative power, and an eighth lens L8 having positive power. The fifth through eighth lenses L5-L8 are arranged in this order such that the fifth lens L5 is located closest to the object in the sub-lens group G1*b* and that the eighth lens L8 is located closest to the image plane in the sub-lens group G1*b*.

The seventh and eighth lenses L7, L8 are bonded together with an adhesive such as a UV curable resin to form a bonded lens. In other words, the bonded lens includes the seventh lens L7 and the eighth lens L8.

The second lens group G2 is made up of a ninth lens L9 having positive power and a tenth lens L10 having negative power. The ninth and tenth lenses L9, L10 are arranged in this order such that the ninth lens L9 is located closer to the object than the tenth lens L10 is and that the tenth lens L10 is located closer to the image plane than the ninth lens L9 is.

The third lens group G3 is made up of an eleventh lens L11 having positive power, a twelfth lens L12 having negative power, and a thirteenth lens L13 having positive power. The eleventh to thirteenth lenses L11-L13 are arranged in this order such that the eleventh lens L11 is located closest to the object in the third lens group G3 and that the thirteenth lens L13 is located closest to the image plane in the third lens group G3.

The twelfth lens L12 and the thirteenth lens L13 are bonded together with an adhesive such as a UV curable resin to form a bonded lens. In other words, the bonded lens includes the twelfth lens L12 and the thirteenth lens L13.

Next, the respective lenses that form these lens groups of the imaging optical system according to this embodiment will be described.

First, the respective lenses belonging to the sub-lens group G1*a* will be described.

The first lens L1 is a meniscus lens having a convex surface facing the object. The second lens L2 is a meniscus lens having a convex surface facing the object. Both surfaces of the second lens L2 are aspheric surfaces. The third lens L3 is a biconcave lens. The fourth lens L4 is a biconvex lens.

Next, the respective lenses belonging to the sub-lens group G1*b* will be described.

The fifth lens L5 is a biconcave lens. The sixth lens L6 is a biconvex lens, both surfaces of which are aspheric surfaces. The seventh lens L7 is a meniscus lens having a convex surface facing the object. The eighth lens L8 is a biconvex lens.

An aperture stop A is interposed between the first lens group G1 and the second lens group G2. Stated otherwise, the aperture stop A is interposed between the sub-lens group G1*b* and the second lens group G2.

Next, the respective lenses that form the second lens group G2 will be described.

The ninth lens L9 is a biconvex lens. The tenth lens L10 is a biconcave lens, both surfaces of which are aspheric surfaces.

The ninth lens L9 is an example of the positive lens Lp. The tenth lens L10 is an example of the negative lens Ln.

Next, the respective lenses that form the third lens group G3 will be described.

The eleventh lens L11 is a biconvex lens. The twelfth lens L12 is a biconcave lens. The thirteenth lens L13 is a meniscus lens having a convex surface facing the object.

While the imaging optical system according to this embodiment is focusing to make a transition from an infinity in-focus state toward a close-object in-focus state, the first lens group G1 does not move, the second lens group G2 moves along the optical axis toward the image plane, and the third lens group G3 does not move. That is to say, while the imaging optical system is focusing to make a transition from the infinity in-focus state toward the close-object in-focus state, the first lens group G1 and the third lens group G3 are fixed with respect to the image plane S and the second lens group G2 moves along the optical axis toward the image plane.

More specifically, while the imaging optical system is focusing to make a transition from the infinity in-focus state toward the close-object in-focus state, the ninth lens L9 and the tenth lens L10 move toward the image plane.

Fourth Embodiment

An imaging optical system according to a fourth embodiment will be described with reference to FIG. 4A.

Figure 4A:
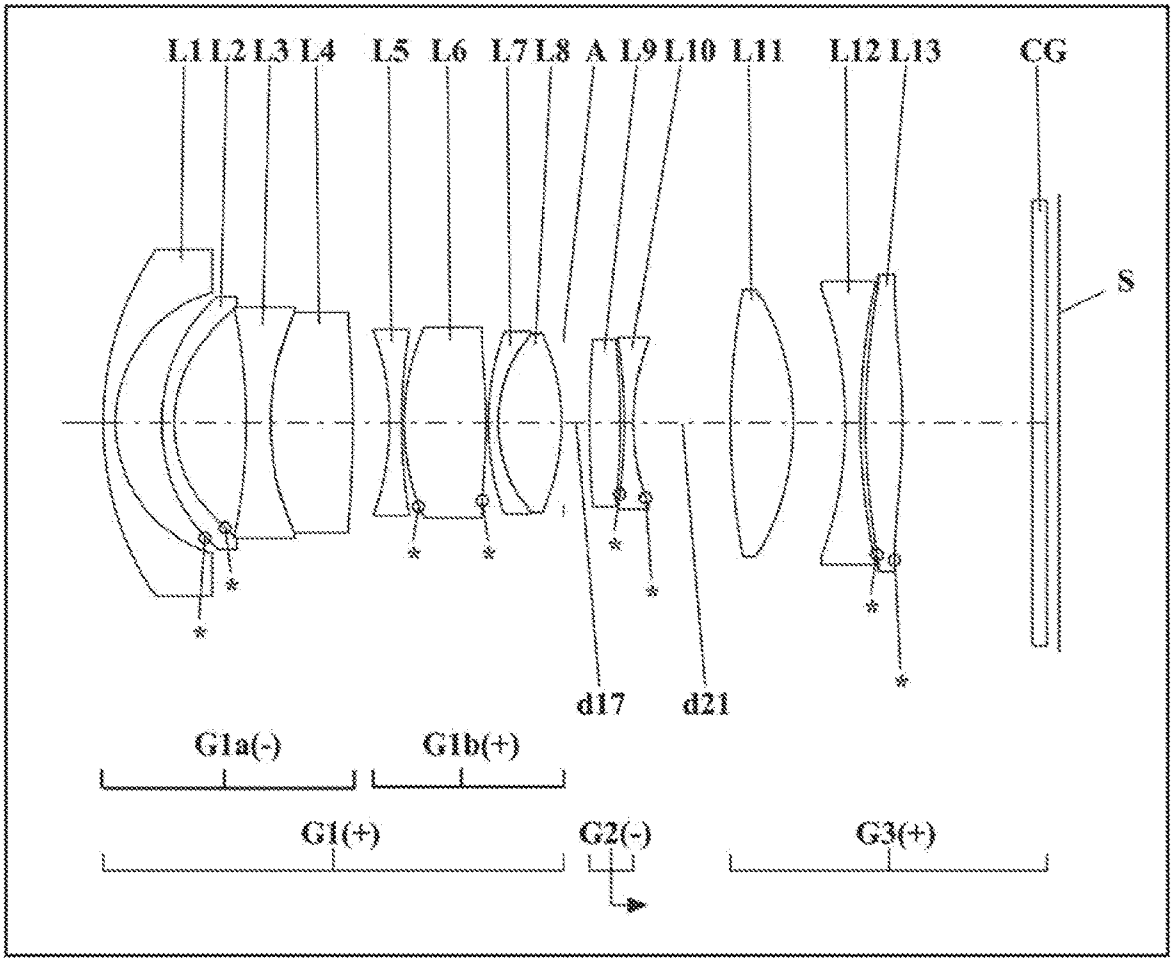
FIG. 4A illustrates lens arrangements showing an infinity in-focus state of an imaging optical system according to a fourth embodiment (corresponding to a fourth example of numerical values)
Figure 4B:
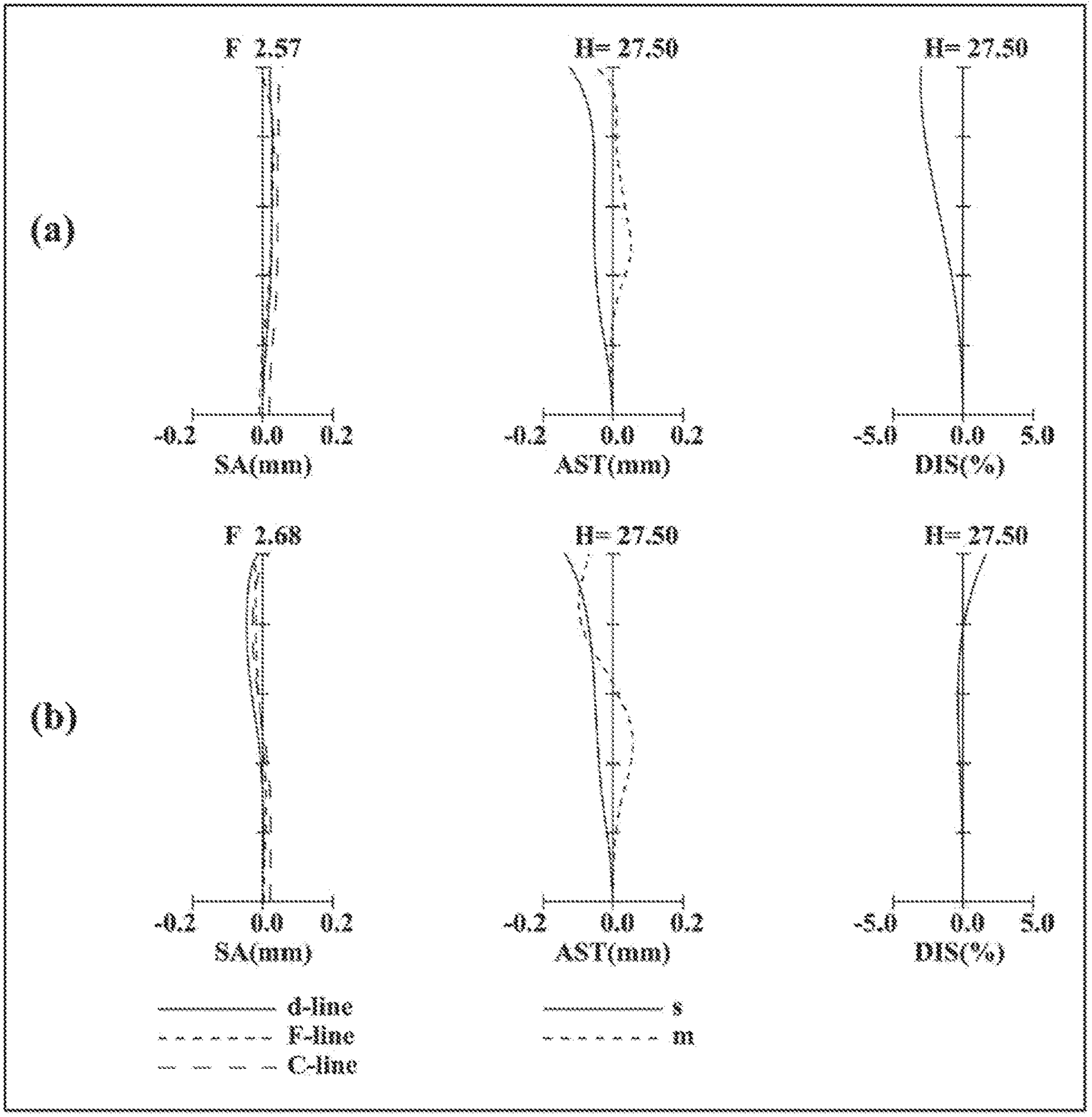
FIG. 4B illustrates longitudinal aberration diagrams showing what state the imaging optical system assumes in the fourth example of numerical values.

FIG. 4A illustrates lens arrangements showing an infinity in-focus state of an imaging optical system according to the fourth embodiment and also illustrates how the imaging optical system operates in the infinity in-focus state.

As shown in FIG. 4A, the imaging optical system according to this embodiment includes a first lens group G1 having positive power, a second lens group G2 having negative power, and a third lens group G3 having positive power. The first, second, and third lens groups G1-G3 are arranged in this order such that the first lens group G1 is located closer to the object than the second lens group G2 or the third lens group G3 is and that the third lens group G3 is located closer to the image plane than the first lens group G1 or the second lens group G2 is.

The first lens group G1 is made up of: a sub-lens group G1*a* having negative power; and a sub-lens group G1*b* having positive power. The sub-lens groups G1*a*, G1*b* are arranged in this order such that the sub-lens group G1*a* is located closer to the object than the sub-lens group G1*b* is and that the sub-lens group G1*b* is located closer to the image plane than the sub-lens group G1*a* is.

The sub-lens group G1*a* is made up of a first lens L1 having negative power, a second lens L2 having negative power, a third lens L3 having negative power, and a fourth lens L4 having positive power. The first to fourth lenses L1-L4 are arranged in this order such that the first lens L1 is located closest to the object in the sub-lens group G1*a* and that the fourth lens L4 is located closest to the image plane in the sub-lens group G1*a*.

The third and fourth lenses L3, L4 are bonded together with an adhesive such as a UV curable resin to form a bonded lens. In other words, the bonded lens includes the third lens L3 and the fourth lens L4.

The sub-lens group G1*b* is made up of a fifth lens L5 having negative power, a sixth lens L6 having positive power, a seventh lens L7 having negative power, and an eighth lens L8 having positive power. The fifth through eighth lenses L5-L8 are arranged in this order such that the fifth lens L5 is located closest to the object in the sub-lens group G1*b* and that the eighth lens L8 is located closest to the image plane in the sub-lens group G1*b*.

The seventh and eighth lenses L7, L8 are bonded together with an adhesive such as a UV curable resin to form a bonded lens. In other words, the bonded lens includes the seventh lens L7 and the eighth lens L8.

The second lens group G2 is made up of a ninth lens L9 having positive power and a tenth lens L10 having negative power. The ninth and tenth lenses L9, L10 are arranged in this order such that the ninth lens L9 is located closer to the object than the tenth lens L10 is and that the tenth lens L10 is located closer to the image plane than the ninth lens L9 is.

The third lens group G3 is made up of an eleventh lens L11 having positive power, a twelfth lens L12 having negative power, and a thirteenth lens L13 having positive power. The eleventh to thirteenth lenses L11-L13 are arranged in this order such that the eleventh lens L11 is located closest to the object in the third lens group G3 and that the thirteenth lens L13 is located closest to the image plane in the third lens group G3.

Next, the respective lenses that form these lens groups of the imaging optical system according to this embodiment will be described.

First, the respective lenses belonging to the sub-lens group G1*a* will be described.

The first lens L1 is a meniscus lens having a convex surface facing the object. The second lens L2 is a meniscus lens having a convex surface facing the object. Both surfaces of the second lens L2 are aspheric surfaces. The third lens L3 is a biconcave lens. The fourth lens L4 is a biconvex lens.

Next, the respective lenses belonging to the sub-lens group G1*b* will be described.

The fifth lens L5 is a biconcave lens. The sixth lens L6 is a biconvex lens, both surfaces of which are aspheric surfaces. The seventh lens L7 is a meniscus lens having a convex surface facing the object. The eighth lens L8 is a biconvex lens.

An aperture stop A is interposed between the first lens group G1 and the second lens group G2. Stated otherwise, the aperture stop A is interposed between the sub-lens group G1*b* and the second lens group G2.

Next, the respective lenses that form the second lens group G2 will be described.

The ninth lens L9 is a biconvex lens. The tenth lens L10 is a biconcave lens, both surfaces of which are aspheric surfaces.

The ninth lens L9 is an example of the positive lens Lp. The tenth lens L10 is an example of the negative lens Ln.

Next, the respective lenses that form the third lens group G3 will be described.

The eleventh lens L11 is a biconvex lens. The twelfth lens L12 is a biconcave lens. The thirteenth lens L13 is a biconvex lens, both surfaces of which are aspheric surfaces.

While the imaging optical system according to this embodiment is focusing to make a transition from an infinity in-focus state toward a close-object in-focus state, the first lens group G1 does not move, the second lens group G2 moves along the optical axis toward the image plane, and the third lens group G3 does not move. That is to say, while the imaging optical system is focusing to make a transition from the infinity in-focus state toward the close-object in-focus state, the first lens group G1 and the third lens group G3 are fixed with respect to the image plane S and the second lens group G2 moves along the optical axis toward the image plane.

More specifically, while the imaging optical system is focusing to make a transition from the infinity in-focus state toward the close-object in-focus state, the ninth lens L9 and the tenth lens L10 move toward the image plane.

Fifth Embodiment

An imaging optical system according to a fifth embodiment will be described with reference to FIG. 5A.

Figure 5A:
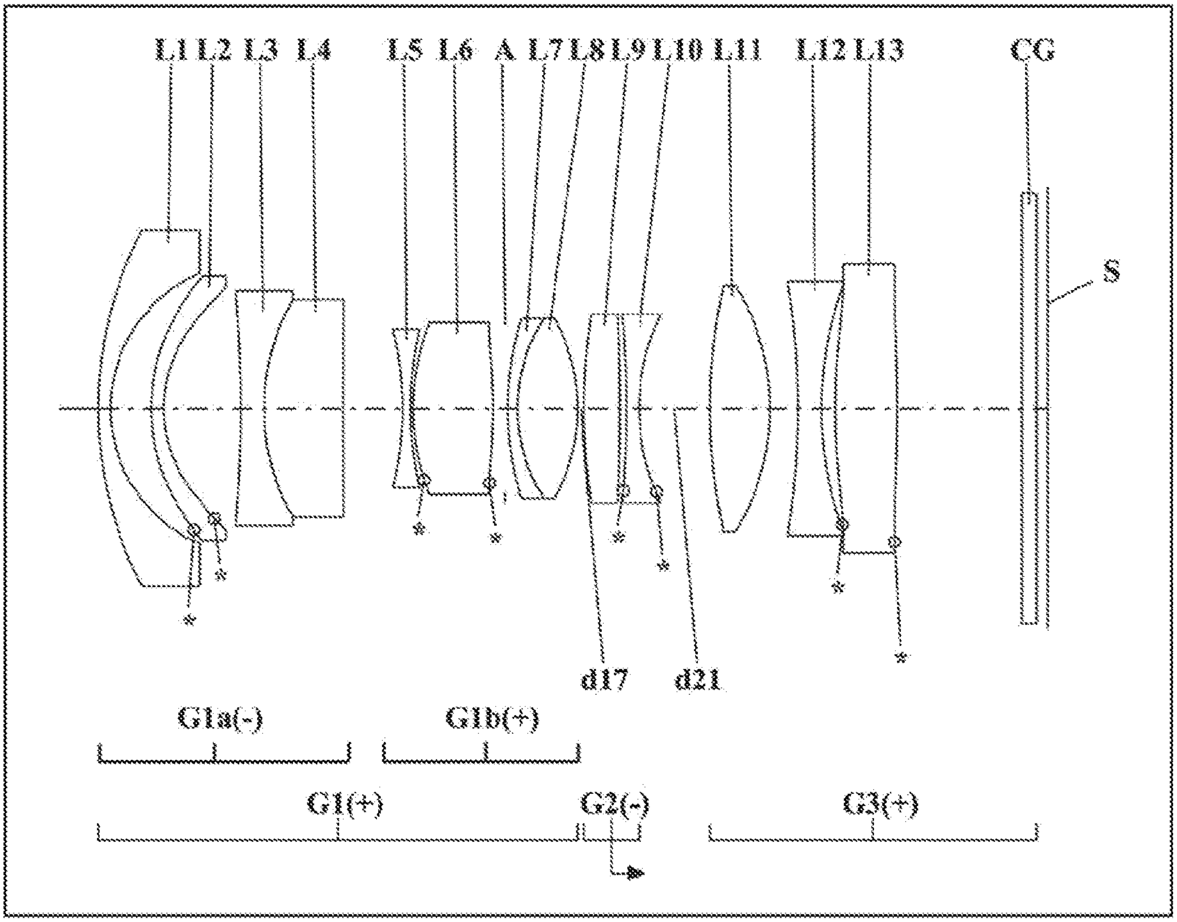
FIG. 5A illustrates lens arrangements showing an infinity in-focus state of an imaging optical system according to a fifth embodiment (corresponding to a fifth example of numerical values)
Figure 5B:
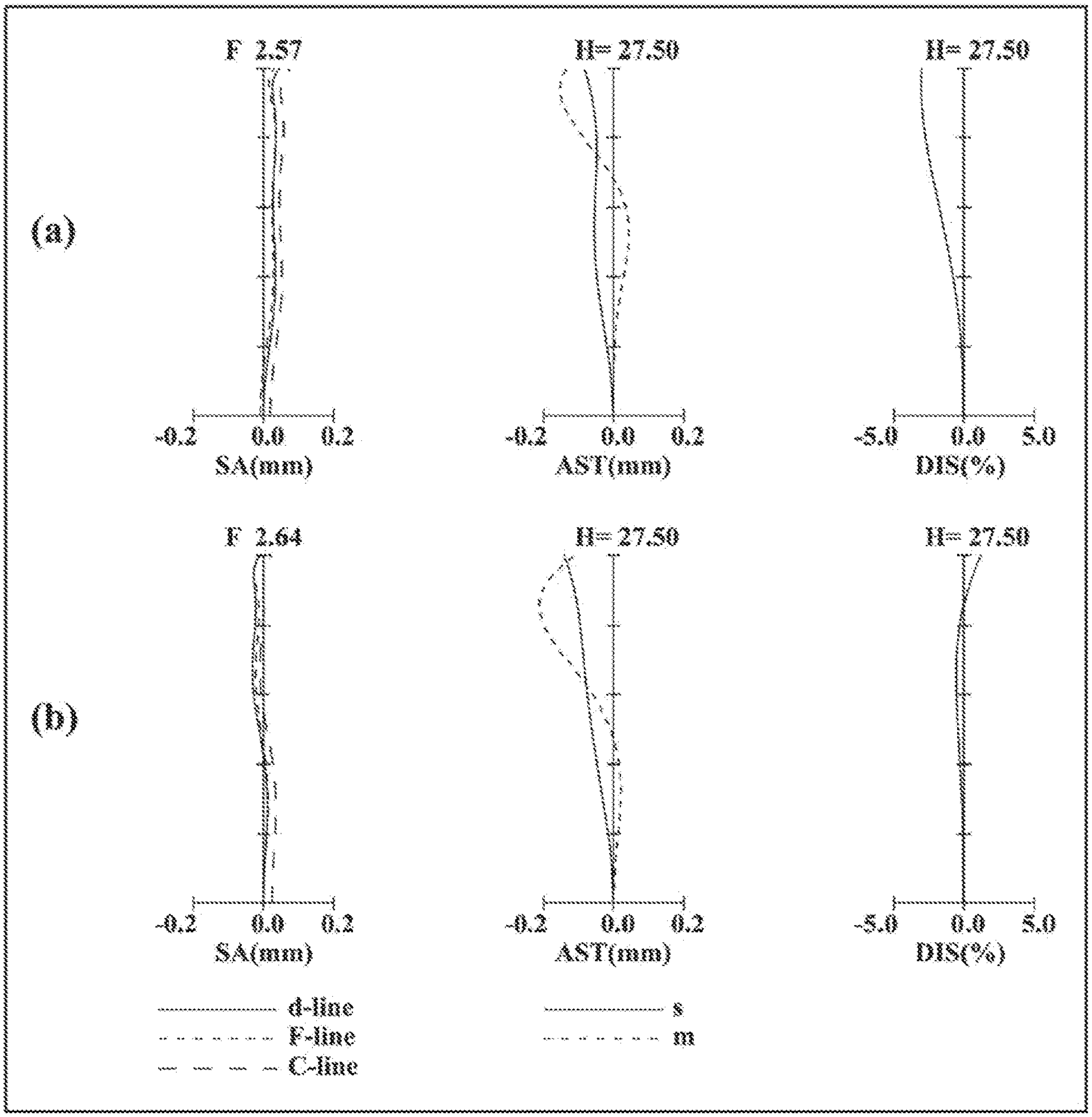
FIG. 5B illustrates longitudinal aberration diagrams showing what state the imaging optical system assumes in the fifth example of numerical values.

FIG. 5A illustrates lens arrangements showing an infinity in-focus state of an imaging optical system according to the fifth embodiment and also illustrates how the imaging optical system operates in the infinity in-focus state.

As shown in FIG. 5A, the imaging optical system according to this embodiment includes a first lens group G1 having positive power, a second lens group G2 having negative power, and a third lens group G3 having positive power. The first, second, and third lens groups G1-G3 are arranged in this order such that the first lens group G1 is located closer to the object than the second lens group G2 or the third lens group G3 is and that the third lens group G3 is located closer to the image plane than the first lens group G1 or the second lens group G2 is.

The first lens group G1 is made up of: a sub-lens group G1*a* having negative power; and a sub-lens group G1*b* having positive power. The sub-lens groups G1*a*, G1*b* are arranged in this order such that the sub-lens group G1*a* is located closer to the object than the sub-lens group G1*b* is and that the sub-lens group G1*b* is located closer to the image plane than the sub-lens group G1*a* is.

The sub-lens group G1*a* is made up of a first lens L1 having negative power, a second lens L2 having negative power, a third lens L3 having negative power, and a fourth lens L4 having positive power. The first to fourth lenses L1-L4 are arranged in this order such that the first lens L1 is located closest to the object in the sub-lens group G1*a* and that the fourth lens L4 is located closest to the image plane in the sub-lens group G1*a*.

The third and fourth lenses L3, L4 are bonded together with an adhesive such as a UV curable resin to form a bonded lens. In other words, the bonded lens includes the third lens L3 and the fourth lens L4.

The sub-lens group G1*b* is made up of a fifth lens L5 having negative power, a sixth lens L6 having positive power, an aperture stop A, a seventh lens L7 having negative power, and an eighth lens L8 having positive power. The fifth and sixth lenses L5, L6, the aperture stop A, and the seventh and eighth lenses L7, L8 are arranged in this order such that the fifth lens L5 is located closest to the object in the sub-lens group G1*b* and the eighth lens L8 is located closest to the image plane in the sub-lens group G1*b*.

The seventh and eighth lenses L7, L8 are bonded together with an adhesive such as a UV curable resin to form a bonded lens. In other words, the bonded lens includes the seventh lens L7 and the eighth lens L8.

The second lens group G2 is made up of a ninth lens L9 having positive power and a tenth lens L10 having negative power. The ninth and tenth lenses L9, L10 are arranged in this order such that the ninth lens L9 is located closer to the object than the tenth lens L10 is and that the tenth lens L10 is located closer to the image plane than the ninth lens L9 is.

The third lens group G3 is made up of an eleventh lens L11 having positive power, a twelfth lens L12 having negative power, and a thirteenth lens L13 having positive power. The eleventh to thirteenth lenses L11-L13 are arranged in this order such that the eleventh lens L11 is located closest to the object in the third lens group G3 and that the thirteenth lens L13 is located closest to the image plane in the third lens group G3.

Next, the respective lenses that form these lens groups of the imaging optical system according to this embodiment will be described.

First, the respective lenses belonging to the sub-lens group G1*a* will be described.

The first lens L1 is a meniscus lens having a convex surface facing the object. The second lens L2 is a meniscus lens having a convex surface facing the object. Both surfaces of the second lens L2 are aspheric surfaces. The third lens L3 is a biconcave lens. The fourth lens L4 is a meniscus lens having a convex surface facing the object.

Next, the respective lenses belonging to the sub-lens group G1*b* will be described.

The fifth lens L5 is a biconcave lens. The sixth lens L6 is a biconvex lens, both surfaces of which are aspheric surfaces. The seventh lens L7 is a meniscus lens having a convex surface facing the object. The eighth lens L8 is a biconvex lens.

Next, the respective lenses that form the second lens group G2 will be described.

The ninth lens L9 is a biconvex lens. The tenth lens L10 is a biconcave lens, both surfaces of which are aspheric surfaces.

The ninth lens L9 is an example of the positive lens Lp. The tenth lens L10 is an example of the negative lens Ln.

Next, the respective lenses that form the third lens group G3 will be described.

The eleventh lens L11 is a biconvex lens. The twelfth lens L12 is a biconcave lens. The thirteenth lens L13 is a biconvex lens, both surfaces of which are aspheric surfaces.

While the imaging optical system according to this embodiment is focusing to make a transition from an infinity in-focus state toward a close-object in-focus state, the first lens group G1 does not move, the second lens group G2 moves along the optical axis toward the image plane, and the third lens group G3 does not move. That is to say, while the imaging optical system is focusing to make a transition from the infinity in-focus state toward the close-object in-focus state, the first lens group G1 and the third lens group G3 are fixed with respect to the image plane S and the second lens group G2 moves along the optical axis toward the image plane.

More specifically, while the imaging optical system is focusing to make a transition from the infinity in-focus state toward the close-object in-focus state, the ninth lens L9 and the tenth lens L10 move toward the image plane.

Sixth Embodiment

An imaging optical system according to a sixth embodiment will be described with reference to FIG. 6A.

Figure 6A:
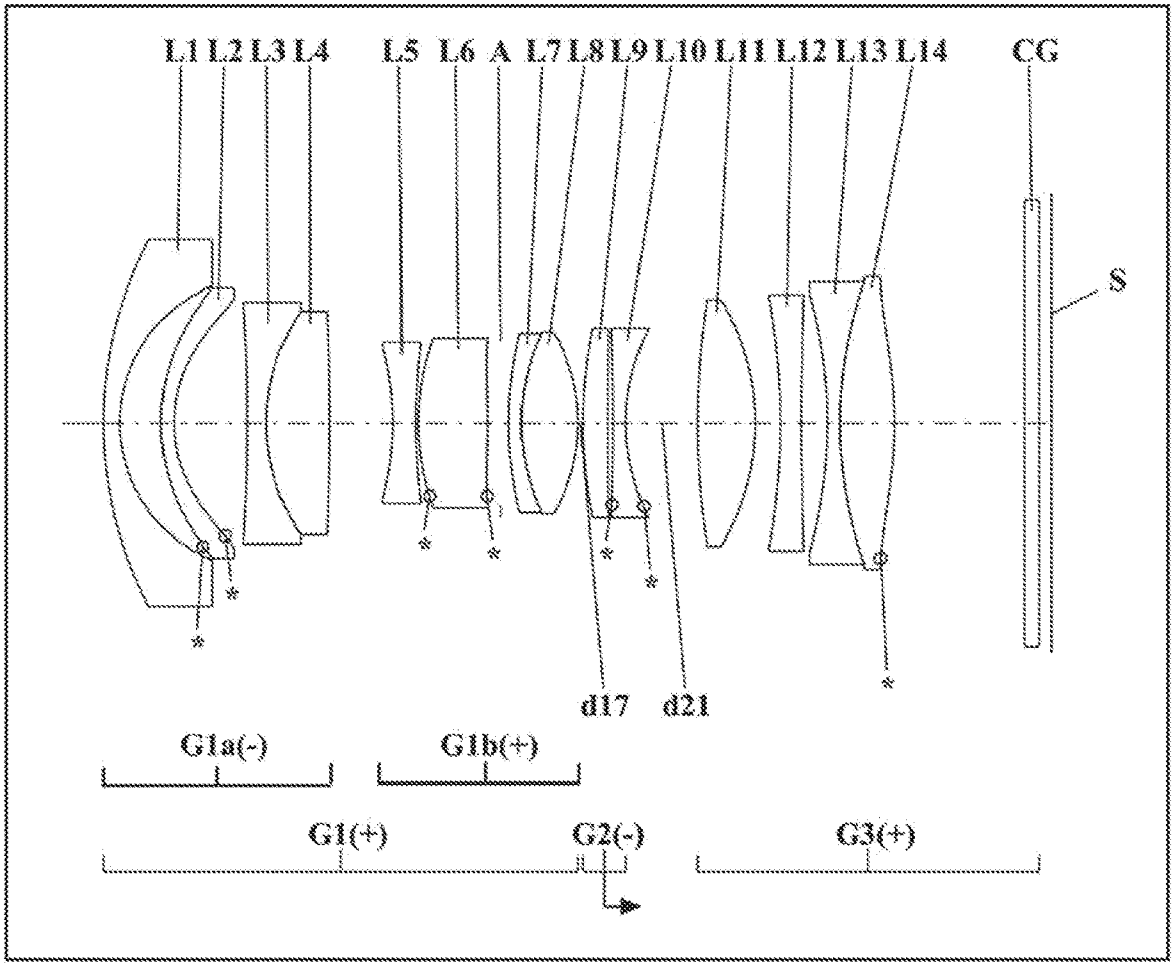
FIG. 6A illustrates lens arrangements showing an infinity in-focus state of an imaging optical system according to a sixth embodiment (corresponding to a sixth example of numerical values)
Figure 6B:
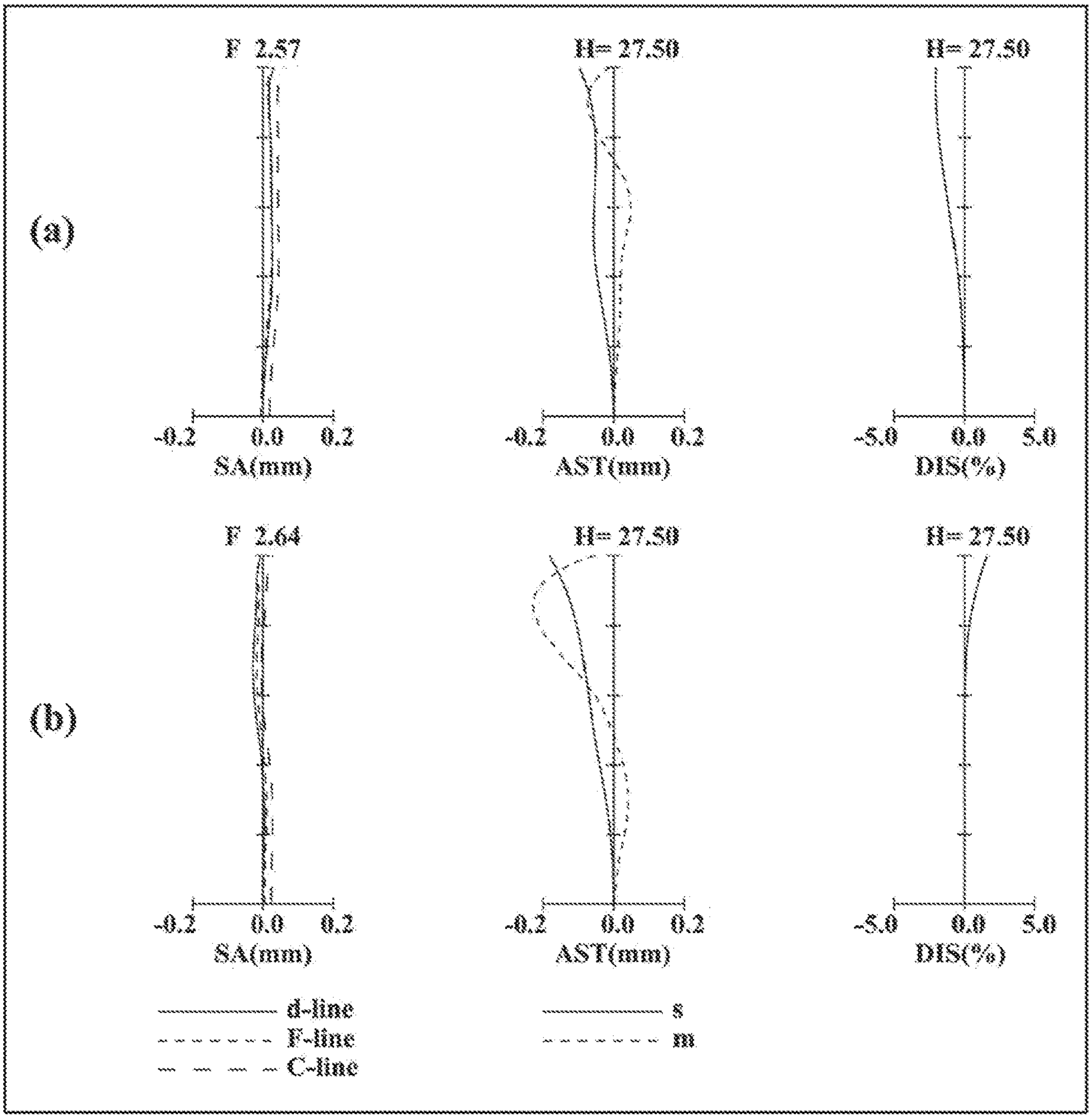
FIG. 6B illustrates longitudinal aberration diagrams showing what state the imaging optical system assumes in the sixth example of numerical values.

FIG. 6A illustrates lens arrangements showing an infinity in-focus state of an imaging optical system according to the sixth embodiment and also illustrates how the imaging optical system operates in the infinity in-focus state.

As shown in FIG. 6A, the imaging optical system according to this embodiment includes a first lens group G1 having positive power, a second lens group G2 having negative power, and a third lens group G3 having positive power. The first, second, and third lens groups G1-G3 are arranged in this order such that the first lens group G1 is located closer to the object than the second lens group G2 or the third lens group G3 is and that the third lens group G3 is located closer to the image plane than the first lens group G1 or the second lens group G2 is.

The first lens group G1 is made up of: a sub-lens group G1*a* having negative power; and a sub-lens group G1*b* having positive power. The sub-lens groups G1*a*, G1*b* are arranged in this order such that the sub-lens group G1*a* is located closer to the object than the sub-lens group G1*b* is and that the sub-lens group G1*b* is located closer to the image plane than the sub-lens group G1*a* is.

The sub-lens group G1*a* is made up of a first lens L1 having negative power, a second lens L2 having negative power, a third lens L3 having negative power, and a fourth lens L4 having positive power. The first to fourth lenses L1-L4 are arranged in this order such that the first lens L1 is located closest to the object in the sub-lens group G1*a* and that the fourth lens L4 is located closest to the image plane in the sub-lens group G1*a*.

The third and fourth lenses L3, L4 are bonded together with an adhesive such as a UV curable resin to form a bonded lens. In other words, the bonded lens includes the third lens L3 and the fourth lens L4.

The sub-lens group G1*b* is made up of a fifth lens L5 having negative power, a sixth lens L6 having positive power, an aperture stop A, a seventh lens L7 having negative power, and an eighth lens L8 having positive power. The fifth and sixth lenses L5, L6, the aperture stop A, and the seventh and eighth lenses L7, L8 are arranged in this order such that the fifth lens L5 is located closest to the object in the sub-lens group G1*b* and the eighth lens L8 is located closest to the image plane in the sub-lens group G1*b*.

The seventh and eighth lenses L7, L8 are bonded together with an adhesive such as a UV curable resin to form a bonded lens. In other words, the bonded lens includes the seventh lens L7 and the eighth lens L8.

The second lens group G2 is made up of a ninth lens L9 having positive power and a tenth lens L10 having negative power. The ninth and tenth lenses L9, L10 are arranged in this order such that the ninth lens L9 is located closer to the object than the tenth lens L10 is and that the tenth lens L10 is located closer to the image plane than the ninth lens L9 is.

The third lens group G3 is made up of an eleventh lens L11 having positive power, a twelfth lens L12 having negative power, a thirteenth lens L13 having positive power, and a fourteenth lens L14 having positive power. The eleventh through fourteenth lenses L11-L14 are arranged in this order such that the eleventh lens L11 is located closest to the object in the third lens group G3 and that the fourteenth lens L14 is located closest to the image plane in the third lens group G3.

The thirteenth and fourteenth lenses L13, L14 are bonded together with an adhesive such as a UV curable resin to form a bonded lens. In other words, the bonded lens includes the thirteenth lens L13 and the fourteenth lens L14.

Next, the respective lenses that form these lens groups of the imaging optical system according to this embodiment will be described.

First, the respective lenses belonging to the sub-lens group G1*a* will be described.

The first lens L1 is a meniscus lens having a convex surface facing the object. The second lens L2 is a meniscus lens having a convex surface facing the object. Both surfaces of the second lens L2 are aspheric surfaces. The third lens L3 is a biconcave lens. The fourth lens L4 is a biconvex lens.

Next, the respective lenses belonging to the sub-lens group G1*b* will be described.

The fifth lens L5 is a biconcave lens. The sixth lens L6 is a biconvex lens, both surfaces of which are aspheric surfaces. The seventh lens L7 is a meniscus lens having a convex surface facing the object. The eighth lens L8 is a biconvex lens.

Next, the respective lenses that form the second lens group G2 will be described.

The ninth lens L9 is a meniscus lens having a convex surface facing the object. The tenth lens L10 is a biconcave lens, both surfaces of which are aspheric surfaces.

The ninth lens L9 is an example of the positive lens Lp. The tenth lens L10 is an example of the negative lens Ln.

Next, the respective lenses that form the third lens group G3 will be described.

The eleventh lens L11 is a biconvex lens. The twelfth lens L12 is a biconcave lens. The thirteenth lens L13 is a biconcave lens. The fourteenth lens L14 is a biconvex lens. An image-side surface of the fourteenth lens L14 is an aspheric surface.

While the imaging optical system according to this embodiment is focusing to make a transition from an infinity in-focus state toward a close-object in-focus state, the first lens group G1 does not move, the second lens group G2 moves along the optical axis toward the image plane, and the third lens group G3 does not move. That is to say, while the imaging optical system is focusing to make a transition from the infinity in-focus state toward the close-object in-focus state, the first lens group G1 and the third lens group G3 are fixed with respect to the image plane S and the second lens group G2 moves along the optical axis toward the image plane.

More specifically, while the imaging optical system is focusing to make a transition from the infinity in-focus state toward the close-object in-focus state, the ninth lens L9 and the tenth lens L10 move toward the image plane.

Seventh Embodiment

An imaging optical system according to a seventh embodiment will be described with reference to FIG. 7A.

Figure 7A:
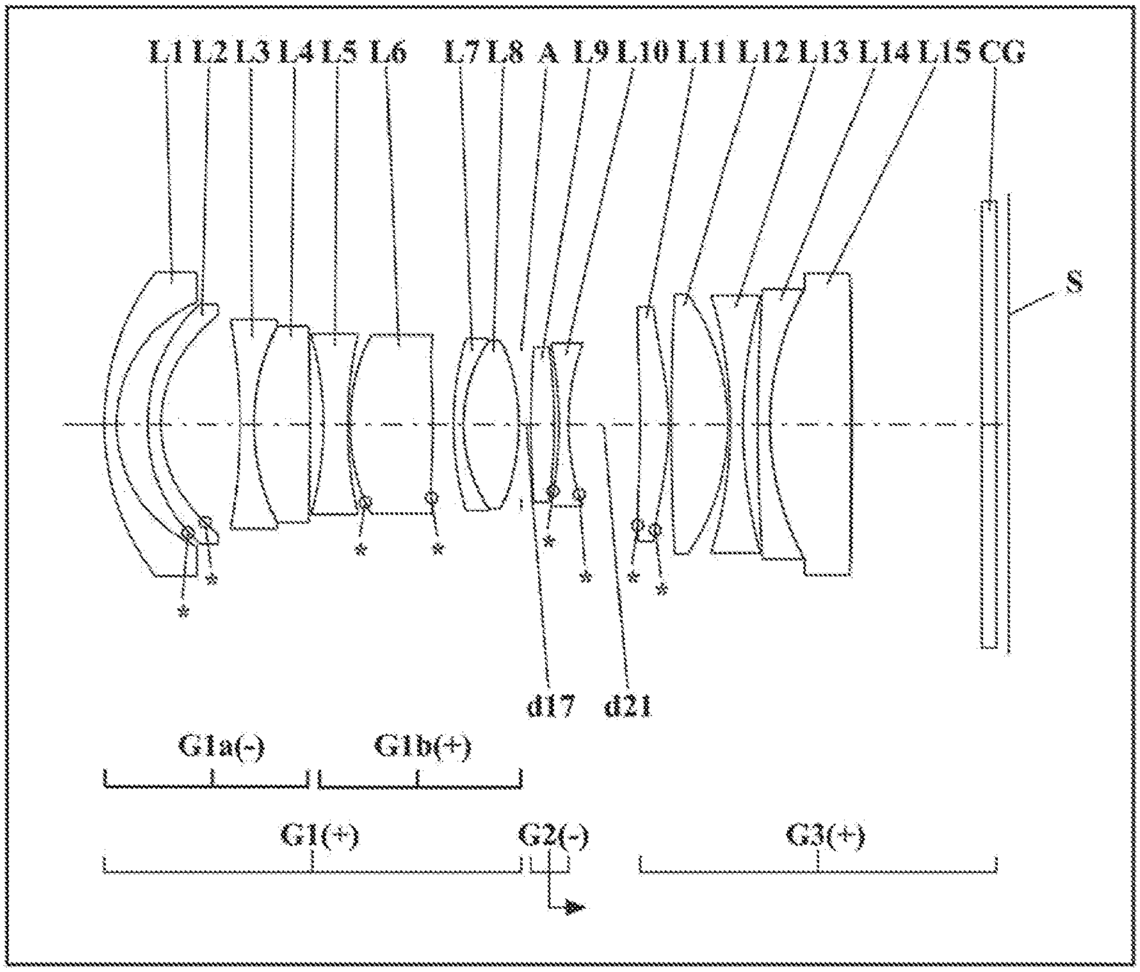
FIG. 7A illustrates lens arrangements showing an infinity in-focus state of an imaging optical system according to a seventh embodiment (corresponding to a seventh example of numerical values)
Figure 7B:
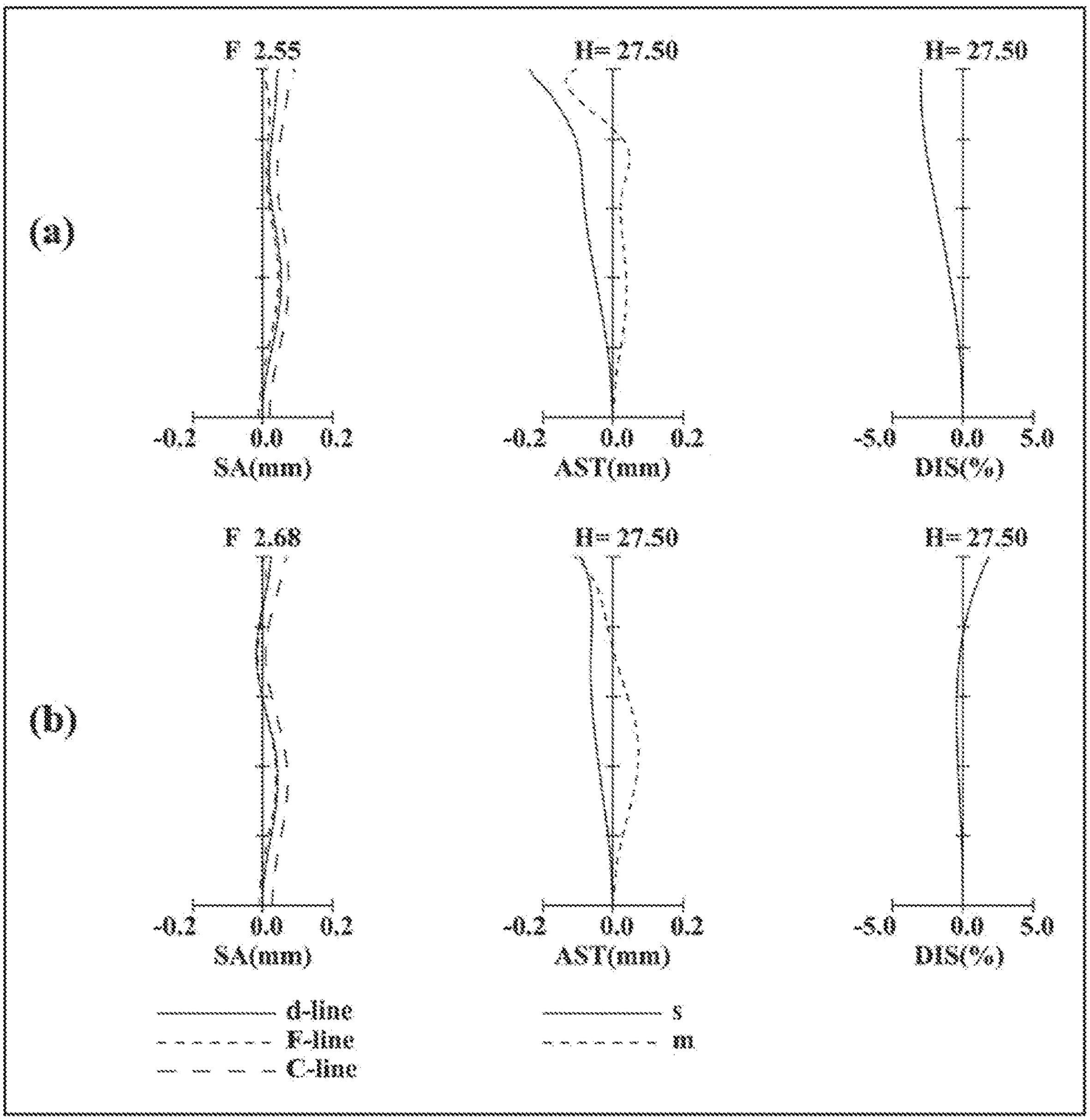
FIG. 7B illustrates longitudinal aberration diagrams showing what state the imaging optical system assumes in the seventh example of numerical values.

FIG. 7A illustrates lens arrangements showing an infinity in-focus state of an imaging optical system according to the seventh embodiment and also illustrates how the imaging optical system operates in the infinity in-focus state.

As shown in FIG. 7A, the imaging optical system according to this embodiment includes a first lens group G1 having positive power, a second lens group G2 having negative power, and a third lens group G3 having positive power. The first, second, and third lens groups G1-G3 are arranged in this order such that the first lens group G1 is located closer to the object than the second lens group G2 or the third lens group G3 is and that the third lens group G3 is located closer to the image plane than the first lens group G1 or the second lens group G2 is.

The first lens group G1 is made up of: a sub-lens group G1*a* having negative power; and a sub-lens group G1*b* having positive power. The sub-lens groups G1*a*, G1*b* are arranged in this order such that the sub-lens group G1*a* is located closer to the object than the sub-lens group G1*b* is and that the sub-lens group G1*b* is located closer to the image plane than the sub-lens group G1*a* is.

The sub-lens group G1*a* is made up of a first lens L1 having negative power, a second lens L2 having negative power, a third lens L3 having negative power, and a fourth lens L4 having positive power. The first to fourth lenses L1-L4 are arranged in this order such that the first lens L1 is located closest to the object in the sub-lens group G1*a* and that the fourth lens L4 is located closest to the image plane in the sub-lens group G1*a*.

The third and fourth lenses L3, L4 are bonded together with an adhesive such as a UV curable resin to form a bonded lens. In other words, the bonded lens includes the third lens L3 and the fourth lens L4.

The sub-lens group G1*b* is made up of a fifth lens L5 having negative power, a sixth lens L6 having positive power, a seventh lens L7 having negative power, and an eighth lens L8 having positive power. The fifth through eighth lenses L5-L8 are arranged in this order such that the fifth lens L5 is located closest to the object in the sub-lens group G1*b* and the eighth lens L8 is located closest to the image plane in the sub-lens group G1*b*.

The seventh and eighth lenses L7, L8 are bonded together with an adhesive such as a UV curable resin to form a bonded lens. In other words, the bonded lens includes the seventh lens L7 and the eighth lens L8.

The second lens group G2 is made up of a ninth lens L9 having positive power and a tenth lens L10 having negative power. The ninth and tenth lenses L9, L10 are arranged in this order such that the ninth lens L9 is located closer to the object than the tenth lens L10 is and that the tenth lens L10 is located closer to the image plane than the ninth lens L9 is.

The third lens group G3 is made up of an eleventh lens L11 having positive power, a twelfth lens L12 having positive power, a thirteenth lens L13 having negative power, a fourteenth lens L14 having negative power, and a fifteenth lens L15 having positive power. The eleventh through fifteenth lenses L11-L15 are arranged in this order such that the eleventh lens L11 is located closest to the object in the third lens group G3 and that the fifteenth lens L15 is located closest to the image plane in the third lens group G3.

The fourteenth and fifteenth lenses L14, L15 are bonded together with an adhesive such as a UV curable resin to form a bonded lens. In other words, the bonded lens includes the fourteenth lens L14 and the fifteenth lens L15.

Next, the respective lenses that form these lens groups of the imaging optical system according to this embodiment will be described.

First, the respective lenses belonging to the sub-lens group G1*a* will be described.

The first lens L1 is a meniscus lens having a convex surface facing the object. The second lens L2 is a meniscus lens having a convex surface facing the object. Both surfaces of the second lens L2 are aspheric surfaces. The third lens L3 is a biconcave lens. The fourth lens L4 is a biconvex lens.

Next, the respective lenses belonging to the sub-lens group G1*b* will be described.

The fifth lens L5 is a biconcave lens. The sixth lens L6 is a biconvex lens, both surfaces of which are aspheric surfaces. The seventh lens L7 is a meniscus lens having a convex surface facing the object. The eighth lens L8 is a biconvex lens.

An aperture stop A is interposed between the first lens group G1 and the second lens group G2. Stated otherwise, the aperture stop A is interposed between the sub-lens group G1*b* and the second lens group G2.

Next, the respective lenses that form the second lens group G2 will be described.

The ninth lens L9 is a biconvex lens. The tenth lens L10 is a biconcave lens, both surfaces of which are aspheric surfaces.

The ninth lens L9 is an example of the positive lens Lp. The tenth lens L10 is an example of the negative lens Ln.

Next, the respective lenses that form the third lens group G3 will be described.

The eleventh lens L11 is a meniscus lens having a convex surface facing the image plane. Both surfaces of the eleventh lens L11 are aspheric surfaces. The twelfth lens L12 is a biconvex lens. The thirteenth lens L13 is a biconcave lens. The fourteenth lens L14 is a meniscus lens having a convex surface facing the object. The fifteenth lens L15 is a biconvex lens.

While the imaging optical system according to this embodiment is focusing to make a transition from an infinity in-focus state toward a close-object in-focus state, the first lens group G1 does not move, the second lens group G2 moves along the optical axis toward the image plane, and the third lens group G3 does not move. That is to say, while the imaging optical system is focusing to make a transition from the infinity in-focus state toward the close-object in-focus state, the first lens group G1 and the third lens group G3 are fixed with respect to the image plane S and the second lens group G2 moves along the optical axis toward the image plane.

More specifically, while the imaging optical system is focusing to make a transition from the infinity in-focus state toward the close-object in-focus state, the ninth lens L9 and the tenth lens L10 move toward the image plane.

(Conditions and Advantages)

Next, conditions that an imaging optical system such as the ones according to the first to seventh embodiments described above may satisfy will be described. That is to say, a plurality of conditions may be defined for the imaging optical system according to each of these seven embodiments. In that case, an imaging optical system, of which the configuration satisfies all of these conditions, is most advantageous. Alternatively, an imaging optical system that achieves its expected advantages by satisfying any of the individual conditions to be described below may also be provided.

For example, as in the imaging optical system according to the first through seventh embodiments described above, an imaging optical system according to the present disclosure consists of: a first lens group G1 having positive power; a second lens group G2 having negative power; and a third lens group G3 having positive power. The first lens group G1, the second lens group G2, and the third lens group G3 are arranged in this order such that the first lens group G1 is located closer to an object than the second lens group G2 or the third lens group G3 is. While the imaging optical system is focusing to make a transition from an infinity in-focus state toward a close-object in-focus state, the second lens group G2 moves along an optical axis of the imaging optical system toward an image plane. The first lens group G1 includes a negative lens having a convex surface facing the object. The negative lens is located closest to the object in the first lens group G1. The second lens group G2 is located closer to the image plane than an aperture stop A is. The second lens group G2 consists of: a positive lens Lp having a convex surface facing the object; and a negative lens Ln. The positive lens Lp and the negative lens Ln are arranged in this order such that the positive lens Lp is located closer to the object than the negative lens Ln is. The third lens group G3 consists of three or more lenses. The three or more lenses include one or more negative lenses. One of the three or more lenses which is located closest to the object in the third lens group G3 is a positive lens (i.e., a lens having positive power).

This basic configuration may reduce the angle of incidence and height of a radial bundle of rays incident on a lens located closest to the object in the imaging optical system and thereby reduce the outside diameter of the lens while reducing the chances of producing high-order aberrations.

An imaging optical system having this basic configuration preferably satisfies the condition expressed by the following Inequality (1):

$$0.8 < |f3/f2| < 3.0 \quad (1)$$

where f2 is a focal length of the second lens group G2 and f3 is a focal length of the third lens group G3. Note that the units of these parameters should be the same (e.g., the units of f2 and f3 are both millimeters).

The condition expressed by this Inequality (1) defines a preferred ratio of the focal length f3 of the third lens group G3 to the focal length f2 of the second lens group G2.

If $|f3/f2|$ were equal to or less than the lower limit value defined by this Inequality (1), the focus sensitivity would decrease and the magnitude of movement during focusing would increase so significantly that it would be difficult to reduce the overall size of the imaging optical system.

If $|f3/f2|$ were equal to or greater than the upper limit value defined by this Inequality (1), then it would be difficult to compensate for the coma, the field curvature, and the chromatic aberration.

To enhance the advantage described above, at least one of the conditions expressed by the following Inequalities (1a) and (1b) is preferably satisfied:

$$0.9 < |f3/f2| \quad (1a)$$

$$|f3/f2| < 2.5. \quad (1b)$$

To further enhance the advantage described above, at least one of the conditions expressed by the following Inequalities (1c) and (1d) is more preferably satisfied:

$$1.0 < |f3/f2| \quad (1c)$$

$$|f3/f2| < 2.0. \quad (1d)$$

An imaging optical system having the above-described basic configuration preferably also satisfies the condition expressed by the following Inequality (2):

$$nLp > 1.8 \quad (2)$$

where nLp is a refractive index of the positive lens Lp.

The condition expressed by this Inequality (2) defines a preferred refractive index nLp of the positive lens Lp in response to a d-line.

If nLp were equal to or less than the lower limit value defined by this Inequality (2), then the curvature of the positive lens Lp would increase so significantly that it would be difficult to reduce the size of the positive lens Lp.

To enhance the advantage described above, the condition expressed by the following Inequality (2a) is preferably satisfied:

$$nLp > 1.9. \quad (2a)$$

To further enhance the advantage described above, the condition expressed by the following Inequality (2b) is more preferably satisfied:

$$nLp > 1.95. \quad (2b)$$

An imaging optical system having the above-described basic configuration preferably also satisfies the condition expressed by the following Inequality (3):

$$0.15 < |fen/fep| < 1.0 \quad (3)$$

where fen is a focal length of a negative lens belonging to the imaging optical system which is located closer to the image plane than any other one of a plurality of negative lenses included in the imaging optical system is, and fep is a focal length of a positive lens belonging to the imaging optical system which is located closer to the image plane than any other one of a plurality of positive lenses included in the imaging optical system is. Note that the units of these parameters should be the same (e.g., the units of fen and fep are both millimeters).

The condition expressed by this Inequality (3) defines a preferred ratio of the focal length fen of a negative lens belonging to the imaging optical system which is located closer to the image plane than any other one of a plurality of negative lenses included in the imaging optical system is to the focal length fep of a positive lens belonging to the imaging optical system which is located closer to the image plane than any other one of a plurality of positive lenses included in the imaging optical system is.

If $|fen/fep|$ were equal to or less than the lower limit value defined by this Inequality (3), then it would be difficult to compensate for various types of aberrations such as chromatic aberration of magnification and coma, among other things.

If |fen/fep| were equal to or greater than the upper limit value defined by this Inequality (3), then it would be difficult to compensate for various types of aberrations such as sagittal coma flare, among other things.

To enhance the advantage described above, at least one of the conditions expressed by the following Inequalities (3a) and (3b) is preferably satisfied:

$$0.2 < |fen/fep| \tag{3a}$$

$$|fen/fep| < 0.9. \tag{3b}$$

To further enhance the advantage described above, at least one of the conditions expressed by the following Inequalities (3c) and (3d) is more preferably satisfied:

$$0.3 < |fen/fep| \tag{3c}$$

$$|fen/fep| < 0.8. \tag{3d}$$

Furthermore, in an imaging optical system having the above-described basic configuration, the first lens group G1 preferably consists of: a sub-lens group G1*a* having negative power; and a sub-lens group G1*b* having positive power. The sub-lens group G1*a* and the sub-lens group G1*b* are arranged in this order such that the sub-lens group G1*a* is located closer to the object than the sub-lens group G1*b* is. A lens belonging to the sub-lens group G1*a* which is located closest to the image plane in the sub-lens group G1*a* is preferably a positive lens belonging to the imaging optical system which is located closer to the object than any other one of a plurality of positive lenses included in the imaging optical system is.

Adopting a power arrangement of a retro-focus type enables not only ensuring a wide angle of view but also reducing the chances of increasing the height of a radial bundle of rays too much. This enables reducing the outside diameter of the lens located closest to the object in the sub-lens group G1*a*, in particular, while ensuring a wide angle of view.

An imaging optical system having the above-described basic configuration preferably also satisfies the condition expressed by the following Inequality (4):

$$0.7 < f1b/f < 2.0 \tag{4}$$

where f1b is a focal length of the sub-lens group G1*b*, and f is a focal length of the imaging optical system when the imaging optical system is in the infinity in-focus state. Note that the units of these parameters should be the same (e.g., the units of f1b and f are both millimeters).

The condition expressed by this Inequality (4) defines a preferred ratio of the focal length f1b of the sub-lens group G1*b* to the focal length f of the imaging optical system when the imaging optical system is in the infinity in-focus state.

If f1b/f were equal to or less than the lower limit value defined by this Inequality (4), then it would be difficult to compensate for various types of aberrations such as coma and spherical aberration, among other things.

If f1b/f were equal to or greater than the upper limit value defined by this Inequality (4), then it would be difficult to reduce the overall size of the imaging optical system.

To enhance the advantage described above, at least one of the conditions expressed by the following Inequalities (4a) and (4b) is preferably satisfied:

$$0.8 < f1b/f \tag{4a}$$

$$f1b/f < 1.8. \tag{4b}$$

To further enhance the advantage described above, at least one of the conditions expressed by the following Inequalities (4c) and (4d) is more preferably satisfied:

$$1.0 < f1b/f \tag{4c}$$

$$f1b/f < 1.5. \tag{4d}$$

An imaging optical system having the above-described basic configuration preferably also satisfies the condition expressed by the following Inequality (5):

$$vd\_G1aN > 60 \tag{5}$$

where vd_G1*a*N is an Abbe number of at least one negative lens out of one or more negative lenses belonging to the sub-lens group G1*a*.

The condition expressed by this Inequality (5) defines a preferred Abbe number of at least one negative lens out of one or more negative lenses belonging to the sub-lens group G1*a*.

Satisfying the condition expressed by this Inequality (5) enables compensating for various types of aberrations such as chromatic aberration of magnification, among other things.

To enhance the advantage described above, the condition expressed by the following Inequality (5a) is preferably satisfied:

$$vd\_G1aN > 65. \tag{5a}$$

To further enhance the advantage described above, the condition expressed by the following Inequality (5b) is more preferably satisfied:

$$vd\_G1aN > 70. \tag{5b}$$

An imaging optical system having the above-described basic configuration preferably also satisfies the condition expressed by the following Inequality (6):

$$vd\_G1bP > 60 \tag{6}$$

where vd_G1*b*P is an Abbe number of at least one positive lens out of one or more positive lenses belonging to the sub-lens group G1*b*.

The condition expressed by this Inequality (6) defines a preferred Abbe number of at least one positive lens out of one or more positive lenses belonging to the sub-lens group G1*b*.

Satisfying the condition expressed by this Inequality (6) enables compensating for various types of aberrations such as axial chromatic aberration, among other things.

To enhance the advantage described above, the condition expressed by the following Inequality (6a) is preferably satisfied:

$$\nu d\_G1bP > 65. \tag{6a}$$

To further enhance the advantage described above, the condition expressed by the following Inequality (6b) is more preferably satisfied:

$$\nu d\_G1bP > 70. \tag{6b}$$

An imaging optical system having the above-described basic configuration preferably also satisfies the condition expressed by the following Inequality (7):

$$0.5 < BF/Y < 1.0 \tag{7}$$

where BF is a back focus length of the imaging optical system, and Y is a maximum image height. Note that the units of these parameters should be the same (e.g., the units of BF and Y are both millimeters).

The condition expressed by this Inequality (7) defines a preferred ratio of a back focus length BF (i.e., the distance between the image-side surface of a lens located closest to the image plane S in the imaging optical system and the image plane S) to the maximum image height.

If BF/Y were equal to or less than the lower limit value defined by this Inequality (7), then the lens located closest to the image plane in the imaging optical system would interfere with the image plane S, which is not beneficial.

If BF/Y were equal to or greater than the upper limit value defined by this Inequality (7), then the overall size of the imaging optical system would increase significantly, which is not beneficial, either.

To enhance the advantage described above, at least one of the conditions expressed by the following Inequalities (7a) and (7b) is preferably satisfied:

$$0.55 < BF/Y \tag{7a}$$

$$BF/Y < 0.8. \tag{7b}$$

To further enhance the advantage described above, at least one of the conditions expressed by the following Inequalities (7c) and (7d) is more preferably satisfied:

$$0.65 < BF/Y \tag{7c}$$

$$BF/Y < 0.7. \tag{7d}$$

Figure 8:
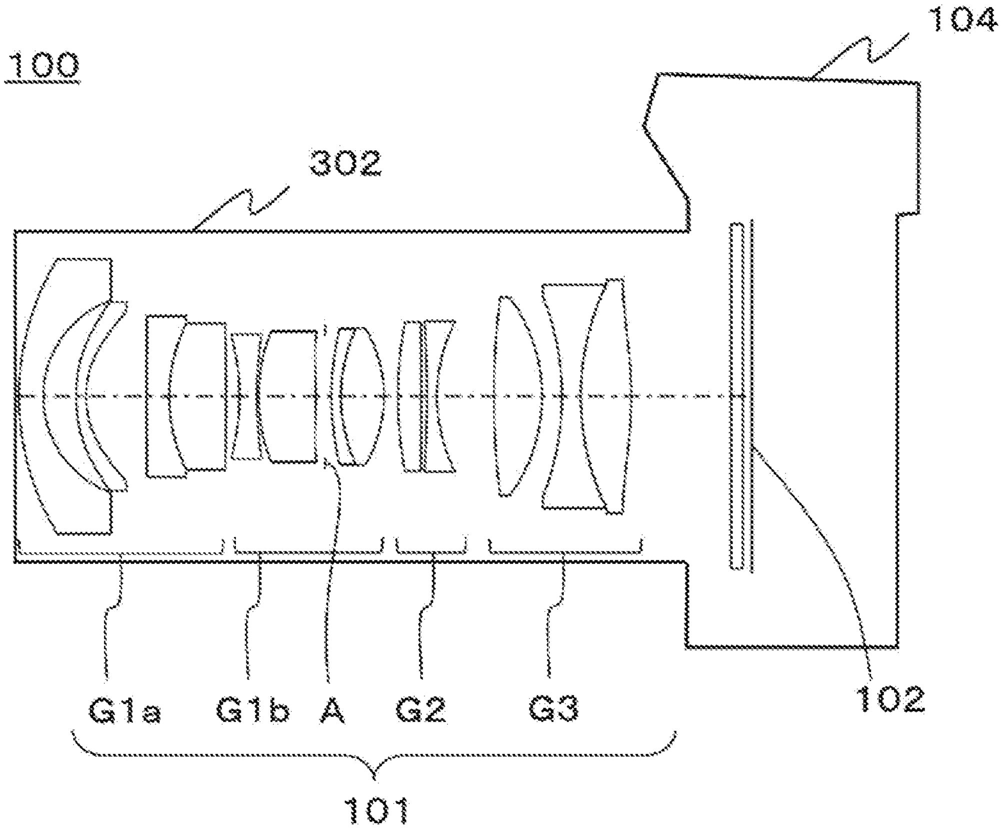
FIG. 8 illustrates a schematic configuration for a digital camera according to the first embodiment.

Schematic Configuration for Image Capture Device to which First Embodiment is Applied FIG. 8 illustrates a schematic configuration for an image capture device, to which the imaging optical system of the first embodiment is applied. Optionally, the imaging optical system according to any one of the second to seventh embodiment is also applicable to the image capture device.

The image capture device 100 includes a housing 104, an image sensor 102, and the imaging optical system 101 according to the first embodiment. Specifically, the image capture device 100 may be implemented as a digital camera, for example.

The housing 104 includes a lens barrel 302. The lens barrel 302 holds the respective lens groups of the imaging optical system 101 and the aperture stop A.

The image sensor 102 is disposed at the image plane S of the imaging optical system 101 according to the first embodiment.

The image capture device 100 transforms an optical image of an object into an electrical image signal and displays and/or stores the image signal thus transformed. The image capture device 100 may include, for example, at least one of a monitor on which the image signal is displayed or a memory that stores the image signal.

The imaging optical system 101 forms an optical image of the object. The image sensor 102 transforms the optical image, formed by the imaging optical system 101, into an electrical image signal.

The imaging optical system 101 is configured such that the first lens group G1 and the third lens group G3 do not move along the optical axis and the second lens group G2 moves along the optical axis. Specifically, to allow the second lens group G2 to move while the imaging optical system 101 is focusing, an actuator and a lens frame, which are included in the housing 104, are attached or coupled to the second lens group G2.

This enables providing an image capture device 100 with the ability to compensate for various types of aberrations sufficiently.

In the example described above, the imaging optical system 101 according to the first embodiment is applied to a digital camera. However, this is only an example and should not be construed as limiting. Alternatively, the imaging optical system 101 is also applicable to a surveillance camera, a smartphone, or any of various other types of image capture devices.

Schematic Configuration for Camera System to which First Embodiment is Applied

Figure 9:
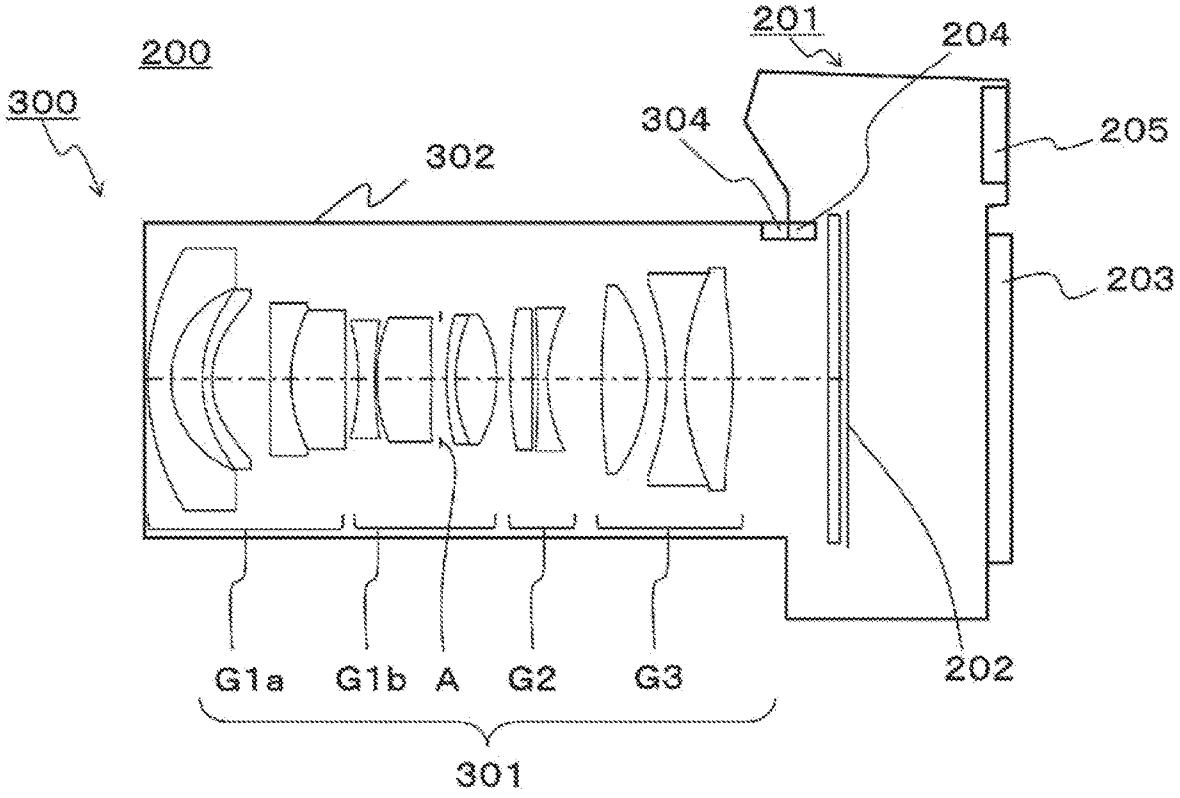
FIG. 9 illustrates a schematic configuration for a lens interchangeable digital camera system according to the first embodiment.

FIG. 9 illustrates a schematic configuration for a camera system, to which the imaging optical system of the first embodiment is applied. Alternatively, the imaging optical system according to any one of the second to seventh embodiments is also applicable to the camera system.

The camera system 200 includes a camera body 201 and an interchangeable lens unit 300 to be connected removably to the camera body 201.

The camera body 201 includes an image sensor 202, a monitor 203, a memory, a camera mount 204, and a viewfinder 205. The image sensor 202 receives an optical image formed by the imaging optical system 301 of the interchangeable lens unit 300 and transforms the optical image into an electrical image signal. The monitor 203 displays the image signal transformed by the image sensor 202. The memory stores the image signal.

The imaging optical system 301 of the interchangeable lens unit 300 is the imaging optical system according to the first embodiment. The interchangeable lens unit 300 makes the imaging optical system 301 form an optical image of the object on the image sensor 202.

The interchangeable lens unit 300 includes not only the imaging optical system 301 but also a lens barrel 302 and a lens mount 304. The lens barrel 302 holds the respective lens groups and aperture stop A of the imaging optical system 301. The lens mount 304 is configured to be connected removably to the camera mount 204 of the camera body 201.

In this manner, the camera mount 204 and the lens mount 304 are physically connected together. In addition, the camera mount 204 and the lens mount 304 also electrically connect together a controller in the camera body 201 and a controller in the interchangeable lens unit 300. That is to say, the camera mount 204 and the lens mount 304 also serve as interfaces that allow themselves to transmit and receive signals to/from each other.

The imaging optical system 301 includes the respective lens groups held by the lens barrel 302. The camera body 201 further includes cover glass CG. The imaging optical system 301 includes the first lens group G1, the second lens group G2, and the third lens group G3. The imaging optical system 301 is configured such that the first lens group G1 and the third lens group G3 do not move along the optical axis and the second lens group G2 moves along the optical axis. Specifically, to allow the second lens group G2 to move while the imaging optical system 301 is focusing, an actuator and a lens frame, which are controlled by the controller in the interchangeable lens unit 300, are arranged.

Other Embodiments

The first through seventh embodiments have been described as exemplary embodiments of the present disclosure. Note that the embodiments described above are only examples of the present disclosure and should not be construed as limiting. Rather, each of those embodiments may be readily modified, replaced, combined with other embodiments, provided with some additional components, or partially omitted without departing from the scope of the present disclosure.

In the first to seventh embodiments described above, each of the lens groups that form the imaging optical system is supposed to consist of only refractive lenses that deflect the incoming light ray through refraction (i.e., lenses of the type that deflect the incoming light ray at the interface between two media with mutually different refractive indices). However, this is only an example and should not be construed as limiting. Alternatively, each lens group may also include diffractive lenses that deflect the incoming light ray through diffraction, refractive-diffractive hybrid lenses that deflect the incoming light ray through a combination of diffraction and refraction, or refractive index distributed lenses that deflect the incoming light ray in accordance with the distribution of refractive indices in the medium, or a combination of two or more types of these lenses. Among other things, a diffraction structure is preferably formed at the interface between two media with mutually different refractive indices in the refractive-diffractive hybrid lenses, because the diffraction efficiency would depend on the wavelength much less heavily in that case. This enables providing an imaging optical system with the ability to compensate for various types of aberrations sufficiently.

(Examples of Numerical Values)

Next, exemplary sets of specific numerical values that were actually adopted in the imaging optical systems with the configurations according to the first through seventh embodiments will be described. Note that in the tables showing these exemplary sets of numerical values, the length is expressed in millimeters (mm), the angle of view is expressed in degrees (°), r indicates the radius of curvature, d indicates the surface interval, nd indicates a refractive index in response to a d-line, νd (also denoted as "νd") indicates an Abbe number in response to a d-line, and a surface with an asterisk (*) is an aspheric surface. The aspheric shape is defined by the following Equation (1):

$$Z = \frac{h^2/r}{1 + \sqrt{1 - (1+\kappa)(h/r)^2}} + \sum A_n h^n$$

where Z is the distance from a point on an aspheric surface, located at a height h as measured from the optical axis, to a tangent plane defined with respect to the vertex of the aspheric surface, h is the height as measured from the optical axis, r is the radius of curvature of the vertex, κ is a conic constant, and An is an $n^{th}$ order aspheric surface coefficient.

FIGS. 1B, 2B, 3B, 4B, 5B, 6B, and 7B are longitudinal aberration diagrams showing what state the imaging optical systems according to the first, second, third, fourth, fifth, sixth, and seventh examples of numerical values assume.

In each longitudinal aberration diagram, portion (a) shows the longitudinal aberrations at the infinity focus point, and portion (b) shows the longitudinal aberrations at the close-object focus point. Each of portions (a) and (b) of these longitudinal aberration diagrams shows spherical aberration (SA (mm)), astigmatism (AST (mm)), and distortion (DIS (%)) in this order from left to right. In each spherical aberration diagram, the ordinate indicates the F number (designated by "F" on the drawings), the solid curve indicates a characteristic in response to a d-line, the shorter dashed curve indicates a characteristic in response to an F-line, and the longer dashed curve indicates a characteristic in response to a C-line. In each astigmatism diagram, the ordinate indicates the image height (designated by "H" on the drawings), the solid curve indicates a characteristic with respect to a sagittal plane (designated by "s" on the drawings), and the dotted curve indicates a characteristic with respect to a meridional plane (designated by "m" on the drawings). Furthermore, in each distortion diagram, the ordinate indicates the image height (designated by "H" on the drawings).

First Example of Numerical Values

Following is a first exemplary set of numerical values for the imaging optical system according to the first embodiment shown in FIG. 1A. Specifically, as the first example of numerical values for the imaging optical system, surface data is shown in Table 1A, aspheric surface data is shown in Table 1B, various types of data in the infinity in-focus state and close-object in-focus state are shown in Table 1C, and data about single lenses is shown in Table 1D.

TABLE 1A (surface data)

| Surface No. | r | d | nd | vd |
|---|---|---|---|---|
| Object surface | ∞ | Variable | | |
| 1 | 41.98340 | 3.83690 | 1.71700 | 47.9 |
| 2 | 16.13370 | 5.21360 | | |
| 3* | 25.13240 | 1.57540 | 1.49710 | 81.6 |
| 4* | 15.61380 | 9.60470 | | |
| 5 | 7761.95280 | 3.52850 | 1.49700 | 81.6 |
| 6 | 25.92840 | 0.01000 | 1.56732 | 42.8 |
| 7 | 25.92840 | 9.00000 | 1.85026 | 32.3 |
| 8 | −539.92510 | 2.11060 | | |
| 9 | −38.04510 | 2.75310 | 1.92119 | 24.0 |
| 10 | 63.70070 | 0.31460 | | |
| 11* | 31.34070 | 9.00000 | 1.81055 | 41.1 |
| 12* | −104.92460 | 1.49830 | | |
| 13 (aperture) | ∞ | 1.00000 | | |
| 14 | 45.09740 | 1.50000 | 1.80100 | 35.0 |
| 15 | 25.76700 | 0.01000 | 1.56732 | 42.8 |
| 16 | 25.76700 | 6.80290 | 1.55032 | 75.5 |
| 17 | −21.28140 | Variable | | |
| 18 | 65.42340 | 3.65450 | 1.98612 | 16.5 |
| 19 | −1297.06110 | 0.91520 | | |
| 20* | −192.01010 | 1.59330 | 1.68948 | 31.0 |
| 21* | 26.06680 | Variable | | |
| 22 | 128.10580 | 7.58650 | 1.49700 | 81.6 |
| 23 | −26.64540 | 3.16130 | | |
| 24 | −42.97710 | 2.98190 | 1.77047 | 29.7 |
| 25 | 40.88830 | 0.01000 | 1.56732 | 42.8 |
| 26 | 40.88830 | 7.97380 | 1.55332 | 71.7 |
| 27* | −58.34340 | 15.80000 | | |
| 28 | ∞ | 1.80000 | 1.51680 | 64.2 |
| 29 | ∞ | 1.50000 | | |
| Image plane | ∞ | | | |

TABLE 1B (Aspheric surface data)

3rd surface

K = 0.00000E+00, A4 = 5.79806E−05, A6 = −4.42528E−07,
A8 = 1.66842E−09, A10 = −3.20578E−12, A12 = 0.00000E+00

4th surface

K = 0.00000E+00, A4 = 4.55357E−05, A6 = −5.70145E−07,
A8 = 1.02342E−09, A10 = 4.49052E−13, A12 = −2.14880E−14

11th surface

K = 0.00000E+00, A4 = 1.88145E−05, A6 = 5.12576E−08,
A8 = −5.68953E−11, A10 = −2.03347E−12, A12 = 7.15591E−15

12th surface

K = 0.00000E+00, A4 = 4.53099E−05, A6 = 1.00345E−07,
A8 = 7.86047E−10, A10 = −5.74300E−12, A12 = 1.08705E−14

20th surface

K = 0.00000E+00, A4 = −1.04448E−05, A6 = 1.57072E−07,
A8 = −1.11369E−09, A10 = 3.02164E−12, A12 = 0.00000E+00

21st surface

K = 0.00000E+00, A4 = −8.69629E−06, A6 = 1.42837E−07,
A8 = −9.90342E−10, A10 = 2.50361E−12, A12 = 0.00000E+00

27th surface

K = 0.00000E+00, A4 = 1.55188E−05, A6 = −3.13592E−09,
A8 = 7.20771E−12, A10 = −2.30043E−14, A12 = 0.00000E+00

TABLE 1C (Various types of data in infinity in-focus state and close-object in-focus state)

| | Infinity | Close-object |
|---|---|---|
| Focal length | 24.2499 | 23.1855 |
| F number | 2.57500 | 2.63094 |
| Angle of view | 49.0630 | 47.3405 |
| Image height | 27.5000 | 27.5000 |
| Total lens length | 115.9069 | 115.9069 |
| BF | 19.1000 | 19.1000 |
| d0 | ∞ | 134.0930 |
| d17 | 2.2316 | 6.9042 |
| d21 | 8.9401 | 4.2675 |
| Entrance pupil position | 20.1086 | 20.1086 |
| Exit pupil position | −61.0153 | −58.1673 |
| Anterior principal point | 34.7157 | 33.4245 |
| Posterior principal point | 91.6257 | 89.0209 |

TABLE 1D (Data about single lenses)

| Lens | Start surface | Focal length |
|---|---|---|
| 1 | 1 | −38.9605 |
| 2 | 3 | −87.7548 |
| 3 | 5 | −52.3529 |
| 4 | 7 | 29.3116 |
| 5 | 9 | −25.5258 |
| 6 | 11 | 30.6801 |
| 7 | 14 | −77.7312 |
| 8 | 16 | 22.3247 |
| 9 | 18 | 63.2425 |
| 10 | 20 | −33.1885 |
| 11 | 22 | 45.1159 |
| 12 | 24 | −26.7811 |
| 13 | 26 | 44.7278 |

Second Example of Numerical Values

Following is a second exemplary set of numerical values for the imaging optical system according to the second embodiment shown in FIG. 2A. Specifically, as the second example of numerical values for the imaging optical system, surface data is shown in Table 2A, aspheric surface data is shown in Table 2B, various types of data in the infinity in-focus state and close-object in-focus state are shown in Table 2C, and data about single lenses is shown in Table 2D.

TABLE 2A (surface data)

| Surface No. | r | d | nd | Vd |
|---|---|---|---|---|
| Object surface | ∞ | Variable | | |
| 1 | 42.47980 | 1.90000 | 1.72916 | 54.7 |
| 2 | 17.79770 | 5.16260 | | |
| 3* | 19.55690 | 1.40750 | 1.51633 | 64.1 |
| 4* | 14.40830 | 11.83380 | | |
| 5 | −104.60110 | 1.21500 | 1.49700 | 81.6 |
| 6 | 47.10200 | 0.01000 | 1.56732 | 42.8 |
| 7 | 47.10200 | 4.78600 | 1.80518 | 25.5 |
| 8 | 542.22900 | 6.31930 | | |
| 9 | −19.64950 | 1.10000 | 1.92286 | 20.9 |
| 10 | −35.53970 | 0.35000 | | |
| 11* | 85.81250 | 7.97220 | 1.81055 | 41.1 |
| 12* | −46.77020 | 0.93560 | | |
| 13 | 40.58560 | 1.10000 | 1.80610 | 33.3 |
| 14 | 20.63950 | 0.01000 | 1.56732 | 42.8 |
| 15 | 20.63950 | 8.14580 | 1.55032 | 75.5 |
| 16 | −27.68300 | 3.63040 | | |

TABLE 2A-continued

| (surface data) | | | | |
|---|---|---|---|---|
| Surface No. | r | d | nd | Vd |
| 17 (aperture) | ∞ | Variable | | |
| 18 | 254.35440 | 2.81700 | 1.98612 | 16.5 |
| 19 | −64.62540 | 0.40960 | | |
| 20* | −53.87550 | 1.55060 | 1.68948 | 31.0 |
| 21* | 35.26700 | Variable | | |
| 22 | 85.03060 | 7.32670 | 1.59410 | 60.5 |
| 23 | −29.71230 | 5.88520 | | |
| 24 | −38.43170 | 1.10000 | 1.85451 | 25.2 |
| 25 | 45.25170 | 0.01000 | 1.56732 | 42.8 |
| 26 | 45.25170 | 6.78950 | 1.51633 | 64.1 |
| 27* | −44.32000 | 16.19590 | | |
| 28 | ∞ | 1.80000 | 1.51680 | 64.2 |
| 29 | ∞ | 1.00000 | | |
| Image plane | ∞ | | | |

TABLE 2B (Aspheric surface data)

3rd surface

K = 0.00000E+00, A4 = 9.54293E−06, A6 = −1.64489E−07, A8 = 3.04689E−10, A10 = −5.63399E−13, A12 = 0.00000E+00

4th surface

K = −1.10056E+00, A4 = 4.20301E−05, A6 = −1.90745E−07, A8 = 4.02908E−10, A10 = −1.26027E−12, A12 = 6.23089E−16

11th surface

K = 0.00000E+00, A4 = 1.90760E−05, A6 = 4.03766E−08, A8 = 2.02660E−11, A10 = −4.20963E−13, A12 = 1.91389E−16

12th surface

K = 0.00000E+00, A4 = 2.54671E−05, A6 = 6.21091E−08, A8 = 1.85956E−11, A10 = 7.07399E−13, A12 = −3.75896E−15

20th surface

K = 0.00000E+00, A4 = 1.23340E−05, A6 = −1.71693E−07, A8 = 1.40130E−09, A10 = −4.63411E−12, A12 = 0.00000E+00

21st surface

K = 0.00000E+00, A4 = 1.83635E−05, A6 = −1.65064E−07, A8 = 1.26600E−09, A10 = −3.91893E−12, A12 = 0.00000E+00

27th surface

K = 0.00000E+00, A4 = 1.81562E−05, A6 = 8.31766E−11, A8 = 1.93659E−11, A10 = −2.45165E−14, A12 = 0.00000E+0

TABLE 2C

| (Various types of data in infinity in-focus state and close-object in-focus state) | | |
|---|---|---|
| | Infinity | Close-object |
| Focal length | 25.0279 | 24.1041 |
| F number | 2.57524 | 2.68882 |
| Angle of view | 48.5653 | 45.7863 |
| Image height | 27.5000 | 27.5000 |
| Total lens length | 115.0000 | 115.0000 |
| BF | 18.9959 | 18.9959 |
| d0 | ∞ | 135.0000 |
| d17 | 3.4763 | 8.4436 |
| d21 | 10.7609 | 5.7937 |
| Entrance pupil position | 21.3382 | 21.3382 |
| Exit pupil position | −53.2799 | −51.7443 |
| Anterior principal point | 34.6046 | 33.2832 |
| Posterior principal point | 89.9506 | 86.9354 |

TABLE 2D

| (Data about single lenses) | | |
|---|---|---|
| Lens | Start surface | Focal length |
| 1 | 1 | −43.4183 |
| 2 | 3 | −116.877 |
| 3 | 5 | −65.1739 |
| 4 | 7 | 63.7887 |
| 5 | 9 | −49.2577 |
| 6 | 11 | 38.3800 |
| 7 | 13 | −53.4131 |
| 8 | 15 | 22.8530 |
| 9 | 18 | 52.4875 |
| 10 | 20 | −30.6960 |
| 11 | 22 | 37.9652 |
| 12 | 24 | −24.1740 |
| 13 | 26 | 44.5136 |

Third Example of Numerical Values

Following is a third exemplary set of numerical values for the imaging optical system according to the third embodiment shown in FIG. 3A. Specifically, as the third example of numerical values for the imaging optical system, surface data is shown in Table 3A, aspheric surface data is shown in Table 3B, various types of data in the infinity in-focus state and close-object in-focus state are shown in Table 3C, and data about single lenses is shown in Table 3D.

TABLE 3A

| (surface data) | | | | |
|---|---|---|---|---|
| Surface No. | r | d | nd | vd |
| Object surface | ∞ | Variable | | |
| 1 | 37.36290 | 1.50000 | 1.80420 | 46.5 |
| 2 | 17.70430 | 2.88130 | | |
| 3* | 24.38100 | 1.50000 | 1.55332 | 71.7 |
| 4* | 16.93400 | 12.35840 | | |
| 5 | −65.62940 | 3.00000 | 1.43700 | 95.1 |
| 6 | 30.83600 | 0.01000 | 1.56732 | 42.8 |
| 7 | 30.83600 | 10.00000 | 1.85883 | 30.0 |
| 8 | −406.36030 | 1.93030 | | |
| 9 | −32.61780 | 3.00000 | 1.92119 | 24.0 |
| 10 | 305.99650 | 0.31130 | | |
| 11* | 37.36490 | 6.43070 | 1.80998 | 40.9 |
| 12* | −57.57490 | 2.75010 | | |
| 13 | 50.37170 | 1.20000 | 1.73037 | 32.2 |
| 14 | 19.91520 | 0.01000 | 1.56732 | 42.8 |
| 15 | 19.91520 | 7.27160 | 1.55032 | 75.5 |
| 16 | −24.84240 | 0.30000 | | |
| 17 (aperture) | ∞ | Variable | | |
| 18 | 98.77830 | 2.93560 | 1.98612 | 16.5 |
| 19 | −98.58670 | 0.55910 | | |
| 20* | −60.98440 | 1.10000 | 1.68948 | 31.0 |
| 21* | 28.71320 | Variable | | |
| 22* | 162.55850 | 10.00000 | 1.76801 | 49.2 |
| 23* | −29.93450 | 0.47910 | | |
| 24 | −100.88590 | 3.00000 | 1.85451 | 25.2 |
| 25 | 37.20260 | 0.01000 | 1.56732 | 42.8 |
| 26 | 37.20260 | 10.00000 | 1.45860 | 90.2 |
| 27 | 1214.78190 | 15.80000 | | |
| 28 | ∞ | 1.80000 | 1.51680 | 64.2 |
| 29 | ∞ | 1.50000 | | |
| Image plane | ∞ | | | |

TABLE 3B (Aspheric surface data)

3rd surface

K = 0.00000E+00, A4 = 5.59949E−05, A6 = −2.59502E−07,
A8 = 9.67356E−10, A10 = −1.73257E−12, A12 = 0.00000E+00

4th surface

K = 0.00000E+00, A4 = 5.14597E−05, A6 = −2.98651E−07,
A8 = 5.89498E−10, A10 = 8.48570E−13, A12 = −1.28110E−14

11th surface

K = 0.00000E+00, A4 = 2.03064E−05, A6 = 7.18983E−08,
A8 = 9.13336E−10, A10 = −5.15473E−12, A12 = 1.89160E−14

12th surface

K = 0.00000E+00, A4 = 4.20573E−05, A6 = 6.17012E−08,
A8 = 1.98129E−09, A10 = −1.27618E−11, A12 = 5.98420E−14

20th surface

K = 0.00000E+00, A4 = 8.73798E−06, A6 = −1.03852E−07,
A8 = 6.78746E−10, A10 = −1.71434E−12, A12 = 0.00000E+00

21st surface

K = 0.00000E+00, A4 = 1.00306E−05, A6 = −8.76378E−08,
A8 = 5.24669E−10, A10 = −1.49547E−12, A12 = 0.00000E+00

22nd surface

K = 0.00000E+00, A4 = 2.24350E−06, A6 = 5.34595E−08,
A8 = 5.13254E−11, A10 = −5.65956E−14, A12 = −3.26968E−17

23rd surface

K = 0.00000E+00, A4 = 1.47830E−05, A6 = 2.42231E−08,
A8 = 1.10549E−10, A10 = −7.71866E−14, A12 = 8.45625E−16

TABLE 3C (Various types of data in infinity in-focus state and close-object in-focus state)

| | Infinity | Close-object |
|---|---|---|
| Focal length | 24.2569 | 23.2899 |
| F number | 2.54863 | 2.64822 |
| Angle of view | 49.4510 | 47.1286 |
| Image height | 27.5000 | 27.5000 |
| Total lens length | 113.9021 | 113.9021 |
| BF | 19.1000 | 19.1000 |
| d0 | ∞ | 136.0978 |
| d17 | 2.3987 | 6.5747 |
| d21 | 9.8659 | 5.6899 |
| Entrance pupil position | 20.0926 | 20.0926 |
| Exit pupil position | −50.4366 | −49.0736 |
| Anterior principal point | 32.6774 | 31.4116 |
| Posterior principal point | 89.6191 | 86.8502 |

TABLE 3D (Data about single lenses)

| Lens | Start surface | Focal length |
|---|---|---|
| 1 | 1 | −43.3143 |
| 2 | 3 | −107.9417 |
| 3 | 5 | −47.5570 |
| 4 | 7 | 33.7285 |
| 5 | 9 | −31.8622 |
| 6 | 11 | 28.8498 |
| 7 | 13 | −45.8597 |
| 8 | 15 | 21.3153 |
| 9 | 18 | 50.4077 |
| 10 | 20 | −28.1728 |
| 11 | 22 | 33.6752 |

TABLE 3D-continued (Data about single lenses)

| Lens | Start surface | Focal length |
|---|---|---|
| 12 | 24 | −31.4924 |
| 13 | 26 | 83.4627 |

Fourth Example of Numerical Values

Following is a fourth exemplary set of numerical values for the imaging optical system according to the fourth embodiment shown in FIG. 4A. Specifically, as the fourth example of numerical values for the imaging optical system, surface data is shown in Table 4A, aspheric surface data is shown in Table 4B, various types of data in the infinity in-focus state and close-object in-focus state are shown in Table 4C, and data about single lenses is shown in Table 4D.

TABLE 4A (surface data)

| Surface No. | r | d | nd | vd |
|---|---|---|---|---|
| Object surface | ∞ | Variable | | |
| 1 | 38.21750 | 1.50000 | 1.72916 | 54.7 |
| 2 | 16.70600 | 5.60160 | | |
| 3* | 25.28460 | 1.50000 | 1.49710 | 81.6 |
| 4* | 16.51000 | 8.81490 | | |
| 5 | −65.43000 | 3.00000 | 1.49700 | 81.6 |
| 6 | 32.46480 | 0.01000 | 1.56732 | 42.8 |
| 7 | 32.46480 | 10.00000 | 1.85883 | 30.0 |
| 8 | −145.82060 | 4.51720 | | |
| 9 | −32.82290 | 1.38580 | 1.92119 | 24.0 |
| 10 | 69.93320 | 0.30000 | | |
| 11* | 30.26200 | 10.00000 | 1.81055 | 41.1 |
| 12* | −66.56620 | 0.30000 | | |
| 13 | 32.62770 | 1.20000 | 1.80610 | 40.7 |
| 14 | 16.95070 | 0.01000 | 1.56732 | 42.8 |
| 15 | 16.95070 | 7.64240 | 1.55032 | 75.5 |
| 16 | −26.46130 | 0.30000 | | |
| 17 (aperture) | ∞ | Variable | | |
| 18 | 119.77670 | 3.77520 | 1.98612 | 16.5 |
| 19 | −95.94080 | 0.50750 | | |
| 20* | −68.01510 | 1.10130 | 1.68948 | 31.0 |
| 21* | 30.44340 | Variable | | |
| 22 | 87.43370 | 7.56690 | 1.59410 | 60.5 |
| 23 | −31.72840 | 6.38420 | | |
| 24 | −46.28880 | 1.92790 | 1.85451 | 25.2 |
| 25 | 79.51840 | 0.60120 | | |
| 26* | 78.54290 | 4.45180 | 1.49710 | 81.6 |
| 27* | −67.07140 | 15.80000 | | |
| 28 | ∞ | 1.80000 | 1.51680 | 64.2 |
| 29 | ∞ | 1.50000 | | |
| Image plane | ∞ | | | |

TABLE 4B (Aspheric surface data)

3rd surface

K = 0.00000E+00, A4 = 5.83677E−05, A6 = −2.93952E−07,
A8 = 1.06406E−09, A10 = −1.59274E−12, A12 = 0.00000E+00

4th surface

K = 0.00000E+00, A4 = 4.78445E−05, A6 = −3.02560E−07,
A8 = −2.30155E−11, A10 = 4.95412E−12, A12 = −2.17819E−14

11th surface

K = 0.00000E+00, A4 = 2.93102E−06, A6 = 2.75435E−08,
A8 = 1.13087E−10, A10 = −1.09135E−12, A12 = 2.59004E−15

TABLE 4B-continued

| (Aspheric surface data) |
|---|
| 12th surface |
| K = 0.00000E+00, A4 = 2.34937E−05, A6 = 3.85095E−08, A8 = 2.95715E−10, A10 = −1.44959E−12, A12 = 2.89494E−15 |
| 20th surface |
| K = 0.00000E+00, A4 = −3.60797E−06, A6 = 6.21816E−08, A8 = −4.83458E−10, A10 = 1.66761E−12, A12 = 0.00000E+00 |
| 21st surface |
| K = 0.00000E+00, A4 = −1.22726E−06, A6 = 5.64417E−08, A8 = −4.07150E−10, A10 = 1.11307E−12, A12 = 0.00000E+00 |
| 26th surface |
| K = 0.00000E+00, A4 = −3.02665E−06, A6 = −9.22280E−09, A8 = 6.25652E−11, A10 = −1.62711E−13, A12 = 0.00000E+00 |
| 27th surface |
| K = 0.00000E+00, A4 = 1.58645E−05, A6 = −1.12292E−08, A8 = 7.05748E−11, A10 = −1.57050E−13, A12 = 0.00000E+00 |

TABLE 4C (Various types of data in infinity in-focus state and close-object in-focus state)

| | Infinity | Close-object |
|---|---|---|
| Focal length | 24.2547 | 23.4162 |
| F number | 2.57329 | 2.68033 |
| Angle of view | 49.4510 | 46.9544 |
| Image height | 27.5000 | 27.5000 |
| Total lens length | 116.4466 | 116.4466 |
| BF | 19.1000 | 19.1000 |
| d0 | ∞ | 133.5532 |
| d17 | 3.1438 | 7.7498 |
| d21 | 11.8047 | 7.1988 |
| Entrance pupil position | 19.9922 | 19.9922 |
| Exit pupil position | −54.0588 | −52.4592 |
| Anterior principal point | 33.3607 | 32.1318 |
| Posterior principal point | 92.1730 | 89.1955 |

TABLE 4D (Data about single lenses)

| Lens | Start surface | Focal length |
|---|---|---|
| 1 | 1 | −41.9375 |
| 2 | 3 | −101.4631 |
| 3 | 5 | −43.2195 |
| 4 | 7 | 31.7402 |
| 5 | 9 | −24.0938 |
| 6 | 11 | 26.9110 |
| 7 | 13 | −45.3123 |
| 8 | 15 | 20.0261 |
| 9 | 18 | 54.4940 |
| 10 | 20 | −30.3631 |
| 11 | 22 | 40.1356 |
| 12 | 24 | −33.9991 |
| 13 | 26 | 73.5233 |

Fifth Example of Numerical Values

Following is a fifth exemplary set of numerical values for the imaging optical system according to the fifth embodiment shown in FIG. 5A. Specifically, as the fifth example of numerical values for the imaging optical system, surface data is shown in Table 5A, aspheric surface data is shown in Table 5B, various types of data in the infinity in-focus state and close-object in-focus state are shown in Table 5C, and data about single lenses is shown in Table 5D.

TABLE 5A (surface data)

| Surface No. | r | d | nd | vd |
|---|---|---|---|---|
| Object surface | ∞ | Variable | | |
| 1 | 49.29930 | 1.50000 | 1.70154 | 41.1 |
| 2 | 18.69340 | 5.21430 | | |
| 3* | 28.06120 | 1.50000 | 1.49710 | 81.6 |
| 4* | 17.55890 | 9.76110 | | |
| 5 | −173.56560 | 2.92040 | 1.49700 | 81.6 |
| 6 | 27.73680 | 0.01000 | 1.56732 | 42.8 |
| 7 | 27.73680 | 10.00000 | 1.85883 | 30.0 |
| 8 | 2347.70720 | 7.48610 | | |
| 9 | −44.05550 | 1.10000 | 1.92119 | 24.0 |
| 10 | 46.96600 | 0.30000 | | |
| 11* | 30.36500 | 10.00000 | 1.81055 | 41.1 |
| 12* | −66.52310 | 1.60600 | | |
| 13 (aperture) | ∞ | 0.30000 | | |
| 14 | 39.39780 | 1.20000 | 1.80420 | 46.5 |
| 15 | 20.85830 | 0.01000 | 1.56732 | 42.8 |
| 16 | 20.85830 | 7.65140 | 1.55032 | 75.5 |
| 17 | −23.66340 | Variable | | |
| 18 | 77.38350 | 4.49530 | 1.98612 | 16.5 |
| 19 | −281.70270 | 0.82790 | | |
| 20* | −149.20800 | 1.59140 | 1.68948 | 31.0 |
| 21* | 27.18050 | Variable | | |
| 22 | 75.41370 | 7.49760 | 1.49700 | 81.6 |
| 23 | −30.12710 | 3.52370 | | |
| 24 | −101.25350 | 3.00000 | 1.85451 | 25.2 |
| 25 | 47.57040 | 1.67360 | | |
| 26* | 79.38340 | 7.87910 | 1.49710 | 81.6 |
| 27* | −154.51180 | 15.80000 | | |
| 28 | ∞ | 1.80000 | 1.51680 | 64.2 |
| 29 | ∞ | 1.50000 | | |
| Image plane | ∞ | | | |

TABLE 5B

| (Aspheric surface data) |
|---|
| 3rd surface |
| K = 0.00000E+00, A4 = 4.63543E−05, A6 = −2.76476E−07, A8 = 8.71329E−10, A10 = −1.26754E−12, A12 = 0.00000E+00 |
| 4th surface |
| K = 0.00000E+00, A4 = 3.76682E−05, A6 = −2.99795E−07, A8 = 2.37778E−10, A10 = 2.19791E−12, A12 = −1.01361E−14 |
| 11th surface |
| K = 0.00000E+00, A4 = −2.07198E−06, A6 = 2.14441E−08, A8 = 1.82032E−10, A10 = −2.61081E−12, A12 = 7.15593E−15 |
| 12th surface |
| K = 0.00000E+00, A4 = 2.32573E−05, A6 = 2.05519E−08, A8 = 6.45729E−10, A10 = −4.68102E−12, A12 = 1.08705E−14 |
| 20th surface |
| K = 0.00000E+00, A4 = −7.12206E−06, A6 = 8.13995E−08, A8 = −4.60553E−10, A10 = 9.00798E−13, A12 = 0.00000E+00 |
| 21st surface |
| K = 0.00000E+00, A4 = −4.97272E−06, A6 = 7.86253E−08, A8 = −4.40131E−10, A10 = 6.96357E−13, A12 = 0.00000E+00 |
| 26th surface |
| K = 0.00000E+00, A4 = −4.16079E−06, A6 = −3.92057E−08, A8 = 1.11311E−10, A10 = −1.89097E−13, A12 = 0.00000E+00 |
| 27th surface |
| K = 0.00000E+00, A4 = 1.40928E−05, A6 = −3.61994E−08, A8 = 6.91797E−11, A10 = −7.15666E−14, A12 = 0.00000E+00 |

TABLE 5C

| (Various types of data in infinity in-focus state and close-object in focus state) | | |
|---|---|---|
| | Infinity | Close-object |
| Focal length | 24.5794 | 23.3493 |
| F number | 2.57235 | 2.63689 |
| Angle of view | 49.0777 | 47.1656 |
| Image height | 27.5000 | 27.5000 |
| Total lens length | 119.9643 | 119.9643 |
| BF | 19.1000 | 19.1000 |
| d0 | ∞ | 130.0356 |
| d17 | 0.8690 | 5.5169 |
| d21 | 8.9473 | 4.2994 |
| Entrance pupil position | 20.3123 | 20.3123 |
| Exit pupil position | −55.3338 | −53.3742 |
| Anterior principal point | 33.9675 | 32.6436 |
| Posterior principal point | 95.3546 | 92.7225 |

TABLE 5D (Data about single lenses)

| Lens | Start surface | Focal length |
|---|---|---|
| 1 | 1 | −43.8062 |
| 2 | 3 | −99.0771 |
| 3 | 5 | −47.8884 |
| 4 | 7 | 32.6170 |
| 5 | 9 | −24.5348 |
| 6 | 11 | 26.9676 |
| 7 | 14 | −56.7550 |
| 8 | 16 | 21.4538 |
| 9 | 18 | 61.9465 |
| 10 | 20 | −33.2247 |
| 11 | 22 | 44.3607 |
| 12 | 24 | −37.5270 |
| 13 | 26 | 106.6863 |

Sixth Example of Numerical Values

Following is a sixth exemplary set of numerical values for the imaging optical system according to the sixth embodiment shown in FIG. 6A. Specifically, as the sixth example of numerical values for the imaging optical system, surface data is shown in Table 6A, aspheric surface data is shown in Table 6B, various types of data in the infinity in-focus state and close-object in-focus state are shown in Table 6C, and data about single lenses is shown in Table 6D.

TABLE 6A (surface data)

| Surface No. | r | d | nd | vd |
|---|---|---|---|---|
| Object surface | ∞ | Variable | | |
| 1 | 47.72880 | 1.99940 | 1.71700 | 47.9 |
| 2 | 17.99750 | 5.02230 | | |
| 3* | 27.52850 | 1.52510 | 1.55332 | 71.7 |
| 4* | 17.28680 | 8.94640 | | |
| 5 | −207.51660 | 2.33180 | 1.49700 | 81.6 |
| 6 | 24.01310 | 0.01000 | 1.56732 | 42.8 |
| 7 | 24.01310 | 7.68950 | 1.83400 | 37.3 |
| 8 | −370.13700 | 7.74190 | | |
| 9 | −35.50960 | 2.74700 | 1.92119 | 24.0 |
| 10 | 79.66260 | 0.31460 | | |
| 11* | 32.81680 | 8.46210 | 1.81055 | 41.1 |
| 12* | −98.43360 | 1.55660 | | |
| 13 (aperture) | ∞ | 1.00000 | | |
| 14 | 45.30730 | 1.50000 | 1.80610 | 40.7 |
| 15 | 25.64590 | 0.01000 | 1.56732 | 42.8 |
| 16 | 25.64590 | 6.94780 | 1.55032 | 75.5 |

TABLE 6A-continued (surface data)

| Surface No. | r | d | nd | vd |
|---|---|---|---|---|
| 17 | −21.72390 | Variable | | |
| 18 | 57.56340 | 3.01740 | 1.98612 | 16.5 |
| 19 | 720.49190 | 0.64050 | | |
| 20* | −1012.68560 | 1.56640 | 1.68948 | 31.0 |
| 21* | 24.38560 | Variable | | |
| 22 | 95.21720 | 7.04870 | 1.49700 | 81.6 |
| 23 | −28.90910 | 2.96570 | | |
| 24 | −83.33330 | 2.57730 | 1.67270 | 32.2 |
| 25 | 435.64510 | 3.17780 | | |
| 26 | −57.46240 | 1.53380 | 1.77047 | 29.7 |
| 27 | 49.75180 | 0.01000 | 1.56732 | 42.8 |
| 28 | 49.75180 | 6.65420 | 1.55332 | 71.7 |
| 29* | −47.31460 | 15.80000 | | |
| 30 | ∞ | 1.80000 | 1.51680 | 64.2 |
| 31 | ∞ | 1.50000 | | |
| Image plane | ∞ | | | |

TABLE 6B

| (Aspheric surface data) |
|---|
| 3rd surface |
| K = 0.00000E+00, A4 = 4.61133E−05, A6 = −2.78762E−07, A8 = 8.84106E−10, A10 = −1.32897E−12, A12 = 0.00000E+00 |
| 4th surface |
| K = 0.00000E+00, A4 = 3.61281E−05, A6 = −3.30742E−07, A8 = 3.68318E−10, A10 = 1.29978E−12, A12 = −9.28779E−15 |
| 11th surface |
| K = 0.00000E+00, A4 = 1.05210E−05, A6 = 4.74583E−08, A8 = −2.12980E−11, A10 = −2.41604E−12, A12 = 7.15596E−15 |
| 12th surface |
| K = 0.00000E+00, A4 = 4.05048E−05, A6 = 7.53700E−08, A8 = 6.86741E−10, A10 = −5.86445E−12, A12 = 1.08705E−14 |
| 20th surface |
| K = 0.00000E+00, A4 = −2.22411E−05, A6 = 2.20881E−07, A8 = −1.24239E−09, A10 = 2.83710E−12, A12 = 0.00000E+00 |
| 21st surface |
| K = 0.00000E+00, A4 = −2.28049E−05, A6 = 2.11857E−07, A8 = −1.20427E−09, A10 = 2.64812E−12, A12 = 0.00000E+00 |
| 29th surface |
| K = 0.00000E+00, A4 = 1.69445E−05, A6 = 3.03606E−09, A8 = −1.54491E−13, A10 = −1.87715E−14, A12 = 0.00000E+00 |

TABLE 6C

| (Various types of data in infinity in-focus state and close-object in-focus state) | | |
|---|---|---|
| | Infinity | Close-object |
| Focal length | 24.2537 | 23.1871 |
| F number | 2.57235 | 2.63635 |
| Angle of view | 49.1591 | 47.4386 |
| Image height | 27.5000 | 27.5000 |
| Total lens length | 115.4243 | 115.4243 |
| BF | 19.1000 | 19.1000 |
| d0 | ∞ | 134.5757 |
| d17 | 0.6247 | 5.3006 |
| d21 | 8.7034 | 4.0275 |
| Entrance pupil position | 19.8152 | 19.8152 |
| Exit pupil position | −57.7648 | −55.7293 |
| Anterior principal point | 33.8819 | 32.6665 |
| Posterior principal point | 91.1503 | 88.5254 |

TABLE 6D

| (Data about single lenses) | | |
|---|---|---|
| Lens | Start surface | Focal length |
| 1 | 1 | −41.4599 |
| 2 | 3 | −88.6788 |
| 3 | 5 | −43.1609 |
| 4 | 7 | 27.2805 |
| 5 | 9 | −26.3612 |
| 6 | 11 | 31.2665 |
| 7 | 14 | −75.8972 |
| 8 | 16 | 22.5454 |
| 9 | 18 | 63.2990 |
| 10 | 20 | −34.5152 |
| 11 | 22 | 45.4777 |
| 12 | 24 | −103.7801 |
| 13 | 26 | −34.3945 |
| 14 | 28 | 44.9259 |

Seventh Example of Numerical Values

Following is a seventh exemplary set of numerical values for the imaging optical system according to the seventh embodiment shown in FIG. 7A. Specifically, as the seventh example of numerical values for the imaging optical system, surface data is shown in Table 7A, aspheric surface data is shown in Table 7B, various types of data in the infinity in-focus state and close-object in-focus state are shown in Table 7C, and data about single lenses is shown in Table 7D.

TABLE 7A

| (surface data) | | | | |
|---|---|---|---|---|
| Surface No. | r | d | nd | vd |
| Object surface | ∞ | Variable | | |
| 1 | 30.51250 | 1.50000 | 1.80610 | 40.7 |
| 2 | 16.25240 | 3.83560 | | |
| 3* | 24.49020 | 1.50000 | 1.55332 | 71.7 |
| 4* | 16.37860 | 9.70960 | | |
| 5 | −69.21560 | 1.76070 | 1.43700 | 95.1 |
| 6 | 27.35390 | 0.01000 | 1.56732 | 42.8 |
| 7 | 27.35390 | 6.74890 | 1.85451 | 25.2 |
| 8 | −381.05350 | 1.65530 | | |
| 9 | −39.62010 | 2.95290 | 1.92119 | 24.0 |
| 10 | 47.97950 | 0.30000 | | |
| 11* | 26.40950 | 10.00000 | 1.81055 | 41.1 |
| 12* | −84.43150 | 2.55530 | | |
| 13 | 37.43490 | 1.20000 | 1.68960 | 31.1 |
| 14 | 18.47640 | 0.01000 | 1.56732 | 42.8 |
| 15 | 18.47640 | 6.68390 | 1.55032 | 75.5 |
| 16 | −25.75630 | 0.30000 | | |
| 17 (aperture) | ∞ | Variable | | |
| 18 | 120.35540 | 2.84210 | 1.98612 | 16.5 |
| 19 | −77.41300 | 0.60140 | | |
| 20* | −48.64240 | 1.10000 | 1.68948 | 31.0 |
| 21* | 29.36680 | Variable | | |
| 22* | −133.82940 | 3.50390 | 1.69350 | 53.2 |
| 23* | −33.11440 | 0.30000 | | |
| 24 | 308.24620 | 6.94430 | 1.80420 | 46.5 |
| 25 | −27.90590 | 0.30000 | | |
| 26 | −53.19930 | 1.44450 | 1.77047 | 29.7 |
| 27 | 58.83140 | 1.79820 | | |
| 28 | 236.40870 | 1.50000 | 1.85883 | 30.0 |
| 29 | 34.19840 | 0.01000 | 1.56732 | 42.8 |
| 30 | 34.19840 | 10.00000 | 1.49700 | 81.6 |
| 31 | −943.34380 | 15.80000 | | |
| 32 | ∞ | 1.80000 | 1.51680 | 64.2 |
| 33 | ∞ | 1.50000 | | |
| Image plane | ∞ | | | |

TABLE 7B

| (Aspheric surface data) |
|---|
| 3rd surface |
| K = 0.00000E+00, A4 = 5.67399E−05, A6 = −2.47601E−07, A8 = 8.85683E−10, A10 = −1.39713E−12, A12 = 0.00000E+00 |
| 4th surface |
| K = 0.00000E+00, A4 = 4.85467E−05, A6 = −2.63094E−07, A8 = −2.02109E−11, A10 = 3.89121E−12, A12 = −2.08238E−14 |
| 11th surface |
| K = 0.00000E+00, A4 = 9.36748E−06, A6 = 5.17976E−08, A8 = 1.08073E−10, A10 = 1.99184E−13, A12 = −7.63348E−16 |
| 12th surface |
| K = 0.00000E+00, A4 = 3.68431E−05, A6 = 1.86544E−08, A8 = 2.00130E−09, A10 = −1.46863E−11, A12 = 5.98419E−14 |
| 20th surface |
| K = 0.00000E+00, A4 = 3.90862E−06, A6 = −4.65962E−08, A8 = 6.18600E−10, A10 = −3.14226E−12, A12 = 0.00000E+00 |
| 21st surface |
| K = 0.00000E+00, A4 = 4.54168E−06, A6 = −3.83384E−08, A8 = 3.95795E−10, A10 = −1.94339E−12, A12 = 0.00000E+00 |
| 22nd surface |
| K = 0.00000E+00, A4 = 2.95662E−06, A6 = 8.18846E−08, A8 = −5.12270E−11, A10 = −5.58432E−13, A12 = −1.18581E−15 |
| 23rd surface |
| K = 0.00000E+00, A4 = 2.25409E−05, A6 = 6.39758E−08, A8 = 2.29688E−10, A10 = −1.40623E−12, A12 = 0.00000E+00 |

TABLE 7C

| (Various types of data in infinity in-focus state and close-object in-focus state) | | |
|---|---|---|
| | Infinity | Close-object |
| Focal length | 24.2568 | 23.5029 |
| F number | 2.54872 | 2.68125 |
| Angle of view | 49.4514 | 46.6083 |
| Image height | 27.5000 | 27.5000 |
| Total lens length | 110.0835 | 110.0835 |
| BF | 19.1000 | 19.1000 |
| d0 | ∞ | 139.9165 |
| d17 | 1.2395 | 5.5686 |
| d21 | 8.6771 | 4.3480 |
| Entrance pupil position | 19.7736 | 19.7736 |
| Exit pupil position | −48.8948 | −47.5931 |
| Anterior principal point | 31.9915 | 30.6726 |
| Posterior principal point | 85.8058 | 82.8138 |

TABLE 7D

| (Data about single lenses) | | |
|---|---|---|
| Lens | Start surface | Focal length |
| 1 | 1 | −45.2652 |
| 2 | 3 | −95.6710 |
| 3 | 5 | −44.6169 |
| 4 | 7 | 30.0965 |
| 5 | 9 | −23.1823 |
| 6 | 11 | 25.8637 |
| 7 | 13 | −54.3076 |
| 8 | 15 | 20.6577 |
| 9 | 18 | 48.1172 |
| 10 | 20 | −26.4066 |
| 11 | 22 | 62.5582 |
| 12 | 24 | 32.1153 |
| 13 | 26 | −36.0572 |

TABLE 7D-continued

| (Data about single lenses) | | |
|---|---|---|
| Lens | Start surface | Focal length |
| 14 | 28 | −46.7141 |
| 15 | 30 | 66.6291 |

(Values Corresponding to Inequalities)

Values, corresponding to the Inequalities (1) to (7), of the respective examples of numerical values are shown in the following Table 1:

TABLE 1

| Condition | Inequality | | Ex. 1 | Ex. 2 | Ex. 3 | Ex. 4 | Ex. 5 | Ex. 6 | Ex. 7 |
|---|---|---|---|---|---|---|---|---|---|
| (1) | \|f3/f2\| | | 1.325 | 1.106 | 1.264 | 1.104 | 1.607 | 1.427 | 1.048 |
| (2) | nLp | L9 | 1.986 | 1.986 | 1.986 | 1.986 | 1.986 | 1.986 | 1.986 |
| (3) | \|fen/fep\| | | 0.599 | 0.543 | 0.377 | 0.462 | 0.352 | 0.766 | 0.701 |
| (4) | f1b/f | | 1.234 | 1.120 | 1.191 | 1.280 | 1.222 | 1.247 | 1.206 |
| (5) | vd_G1aN | L2 | 81.6 | 64.1 | 71.7 | 81.6 | 81.6 | 71.7 | 71.7 |
| | | L3 | 81.6 | 81.6 | 95.1 | 81.6 | 81.6 | 81.6 | 95.1 |
| (6) | vd_G1bP | L8 | 75.5 | 75.5 | 75.5 | 75.5 | 75.5 | 75.5 | 75.5 |
| (7) | BF/Y | | 0.695 | 0.691 | 0.695 | 0.695 | 0.695 | 0.695 | 0.695 |

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

INDUSTRIAL APPLICABILITY

The imaging optical system according to the present disclosure is applicable to various types of cameras including digital still cameras, lens interchangeable digital cameras, digital camcorders, cameras for cellphones and smartphones, and cameras for personal digital assistants (PDAs), surveillance cameras for surveillance systems, Web cameras, and onboard cameras. Among other things, the present disclosure is particularly effectively applicable as an imaging optical system for digital still camera systems, digital camcorder systems, and other camera systems that require high image quality.

The invention claimed is:

1. An imaging optical system consisting of:

a first lens group having positive power;

a second lens group having negative power; and a third lens group having positive power, the first lens group, the second lens group, and the third lens group being arranged in this order such that the first lens group is located closer to an object than the second lens group or the third lens group is, the second lens group moving along an optical axis of the imaging optical system toward an image plane, while the imaging optical system is focusing to make a transition from an infinity in-focus state toward a close-object in-focus state, the first lens group including a negative lens having a convex surface facing the object, the negative lens being located closest to the object in the first lens group, the second lens group being located closer to the image plane than an aperture stop is, the second lens group consisting of:

a positive lens Lp having a convex surface facing the object; and a negative lens Ln, the positive lens Lp and the negative lens Ln being arranged in this order such that the positive lens Lp is located closer to the object than the negative lens Ln is, the third lens group consisting of three or more lenses, the three or more lenses including one or more negative lenses, one of the three or more lenses which is located closest to the object in the third lens group being a positive lens, the imaging optical system satisfying the following Inequality (1):

$$0.8 < |f3/f2| < 3.0 \quad (1)$$

where f2 is a focal length of the second lens group, and f3 is a focal length of the third lens group.

2. The imaging optical system of claim 1, wherein the imaging optical system satisfies the following Inequality (2):

$$nLp > 1.8 \quad (2)$$

where nLp is a refractive index of the positive lens Lp.

3. The imaging optical system of claim 1, wherein the imaging optical system satisfies the following Inequality (3):

$$0.15 < |fen/fep| < 1.0 \quad (3)$$

where fen is a focal length of a negative lens belonging to the imaging optical system which is located closer to the image plane than any other one of a plurality of negative lenses included in the imaging optical system is, and fep is a focal length of a positive lens belonging to the imaging optical system which is located closer to the image plane than any other one of a plurality of positive lenses included in the imaging optical system is.

4. An imaging optical system consisting of:

a first lens group having positive power;

a second lens group having negative power; and a third lens group having positive power, the first lens group, the second lens group, and the third lens group being arranged in this order such that the first lens group is located closer to an object than the second lens group or the third lens group is, the second lens group moving along an optical axis of the imaging optical system toward an image plane, while the imaging optical system is focusing to make a transition from an infinity in-focus state toward a close-object in-focus state, the first lens group including a negative lens having a convex surface facing the object, the negative lens being located closest to the object in the first lens group, the second lens group being located closer to the image plane than an aperture stop is, the second lens group consisting of:

a positive lens Lp having a convex surface facing the object; and a negative lens Ln, the positive lens Lp and the negative lens Ln being arranged in this order such that the positive lens Lp is located closer to the object than the negative lens Ln is, the third lens group consisting of three or more lenses, the three or more lenses including one or more negative lenses, one of the three or more lenses which is located closest to the object in the third lens group being a positive lens, the first lens group consisting of:

a sub-lens group G1*a* having negative power; and a sub-lens group G1*b* having positive power, the sub-lens group G1*a* and the sub-lens group G1*b* being arranged in this order such that the sub-lens group G1*a* is located closer to the object than the sub-lens group G1*b* is, and a lens belonging to the sub-lens group G1*a* which is located closest to the image plane in the sub-lens group G1*a* being a positive lens belonging to the imaging optical system which is located closer to the object than any other one of a plurality of positive lenses included in the imaging optical system is.

5. The imaging optical system of claim 4, wherein the imaging optical system satisfies the following Inequality (4):

$$0.7 < f1b/f < 2.0 \quad (4)$$

where f1b is a focal length of the sub-lens group G1*b*, and f is a focal length of the imaging optical system when the imaging optical system is in the infinity in-focus state.

6. The imaging optical system of claim 4, wherein the imaging optical system satisfies the following Inequality (5):

$$\nu d\_G1aN > 60 \quad (5)$$

where vd_G1*a*N is an Abbe number of at least one negative lens out of one or more negative lenses belonging to the sub-lens group G1*a*.

7. The imaging optical system of claim 4, wherein the imaging optical system satisfies the following Inequality (6):

$$\nu d\_G1bP > 60 \quad (6)$$

where vd_G1*b*P is an Abbe number of at least one positive lens out of one or more positive lenses belonging to the sub-lens group G1*b*.

8. An imaging optical system consisting of:

a first lens group having positive power;

a second lens group having negative power; and a third lens group having positive power, the first lens group, the second lens group, and the third lens group being arranged in this order such that the first lens group is located closer to an object than the second lens group or the third lens group is, the second lens group moving along an optical axis of the imaging optical system toward an image plane, while the imaging optical system is focusing to make a transition from an infinity in-focus state toward a close-object in-focus state, the first lens group including a negative lens having a convex surface facing the object, the negative lens being located closest to the object in the first lens group, the second lens group being located closer to the image plane than an aperture stop is, the second lens group consisting of:

a positive lens Lp having a convex surface facing the object; and a negative lens Ln, the positive lens Lp and the negative lens Ln being arranged in this order such that the positive lens Lp is located closer to the object than the negative lens Ln is, the third lens group consisting of three or more lenses, the three or more lenses including one or more negative lenses, one of the three or more lenses which is located closest to the object in the third lens group being a positive lens, the imaging optical system satisfying the following Inequality (7):

$$0.5 < BF/Y < 1.0 \quad (7)$$

where BF is a back focus length of the imaging optical system, and

Y is a maximum image height.

9. A camera system comprising:

an interchangeable lens unit including the imaging optical system of claim 1; and a camera body including: an image sensor configured to receive an optical image formed by the imaging optical system and transform the optical image into an electrical image signal;

and a camera mount, the camera body being configured to be connected removably to the interchangeable lens unit via the camera mount, the interchangeable lens unit forming the optical image of the object on the image sensor.

10. An image capture device configured to transform an optical image of the object into an electrical image signal and display and/or store the electrical image signal thus transformed, the image capture device comprising:

the imaging optical system of claim 1 configured to form the optical image of the object; and an image sensor configured to transform the optical image formed by the imaging optical system into the electrical image signal.

* * * * *